(12) United States Patent
Takemura et al.

(10) Patent No.: US 8,705,996 B2
(45) Date of Patent: Apr. 22, 2014

(54) IMAGE FORMING APPARATUS CONTROLLING TONER IMAGE OVERLAPPING RATIO

(71) Applicant: Canon Kabushiki Kaisha, Tokyo (JP)

(72) Inventors: Taichi Takemura, Abiko (JP); Toshinori Nakayama, Kashiwa (JP); Masayuki Tamaki, Toride (JP); Jiro Ishizuka, Moriya (JP); Kazuhisa Kemmochi, Suntou-gun (JP); Hikaru Osada, Kamakura (JP); Keisuke Abe, Yokohama (JP); Tsutomu Miki, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/779,151

(22) Filed: Feb. 27, 2013

(65) Prior Publication Data

US 2013/0170849 A1    Jul. 4, 2013

Related U.S. Application Data

(63) Continuation of application No. PCT/JP2011/070305, filed on Aug. 31, 2011.

(30) Foreign Application Priority Data

Aug. 31, 2010   (JP) .................................. 2010-193703

(51) Int. Cl.
*G03G 15/20*   (2006.01)
*G03G 15/01*   (2006.01)

(52) U.S. Cl.
USPC ............................................. 399/68; 399/223

(58) Field of Classification Search
USPC .................... 399/67, 68, 38, 53, 40, 222, 223
See application file for complete search history.

(56) References Cited

U.S. PATENT DOCUMENTS

| 7,344,816 B2 | 3/2008 | Matsumura et al. | |
| 7,426,353 B1* | 9/2008 | Sakakibara | .................... 399/68 |
| 2012/0093550 A1* | 4/2012 | Takemura | ..................... 399/329 |
| 2012/0163870 A1* | 6/2012 | Tamaki | ........................ 399/223 |

FOREIGN PATENT DOCUMENTS

| JP | 64-91156 A | 4/1989 |
| JP | 2-74976 A | 3/1990 |
| JP | 2004-29563 A | 1/2004 |
| JP | 2004-295144 A | 10/2004 |

(Continued)

OTHER PUBLICATIONS

International Search Report and Written Opinion mailed Dec. 13, 2011, in International Application No. PCT/JP2011/070305.

*Primary Examiner* — Sophia S Chen

(74) *Attorney, Agent, or Firm* — Fitzpatrick, Cella, Harper & Scinto

(57) ABSTRACT

When an unfixed toner image is formed on a recording material, a maximum toner amount per unit area satisfies $A<(\rho \Pi L)/30\sqrt{3}$, where a specific gravity of a toner is $\rho$ (g/cm$^3$), a weight-average particle size is L (μm), and the toner amount per unit area of the unfixed toner image on the recording material is A (mg/cm$^2$), in formation of the unfixed toner image with each color toner, and the unfixed toner image is fixed so that a region where colors of chromatic toners of respective colors in the above-described images are seen in an overlaid state is 84% or more.

5 Claims, 12 Drawing Sheets

(56) References Cited

FOREIGN PATENT DOCUMENTS

| JP | 2005-195670 A | 7/2005 |
| JP | 2005-195674 A | 7/2005 |
| JP | 2006-349701 A | 12/2006 |

* cited by examiner (a)

(b)

$L \ [\mu m]$ $V_{\bigcirc} = \frac{4}{3}\pi\left(\frac{L}{2}\right)^3 \ [\mu m^3]$ $S_{\bigcirc} = \pi\left(\frac{L}{2}\right)^2 \ [\mu m^2]$ $S_{\triangle} = \frac{\sqrt{3}}{2} L^2 \ [\mu m^2]$ $H = \frac{V_{\bigcirc}}{S_{\triangle}} = \frac{4}{3}\pi\left(\frac{L}{2}\right)^3 \cdot \frac{2}{\sqrt{3}L^2} = \frac{\pi L}{3\sqrt{3}} \ [\mu m]$ $T = (1 - \frac{S_{\bigcirc}}{S_{\triangle}}) \times 100 = (1 - \pi\left(\frac{L}{2}\right)^2 \cdot \frac{2}{\sqrt{3}L^2}) \times 100 = 9.31 \ [\%]$ $L\ [\mu m]$ $t\ [\mu m]$ $V_○ = \dfrac{4}{3}\pi\left(\dfrac{L}{2}\right)^3\ [\mu m^3]$ $S_○ = \pi\left(\dfrac{L}{2}\right)^2\ [\mu m^2]$ $S_△ = \dfrac{\sqrt{3}}{2}(L+t)^2\ [\mu m^2]$

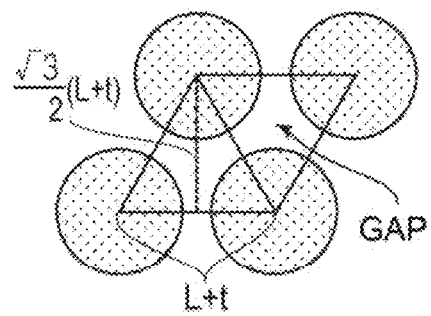

$H_○ = \dfrac{V_○}{S_△} = \dfrac{4}{3}\pi\left(\dfrac{L}{2}\right)^3 \cdot \dfrac{2}{\sqrt{3}(L+t)^2} = \dfrac{\pi L^3}{3\sqrt{3}(L+t)^2}\ [\mu m]$ $T_○ = \left(1 - \dfrac{S_○}{S_△}\right) \times 100 = \left(1 - \pi\left(\dfrac{L}{2}\right)^3 \cdot \dfrac{2}{\sqrt{3}(L+t)^2}\right) \times 100$ $= \left(1 - \dfrac{3H_○}{2L}\right) \times 100\ [\%]$

Fig. 15

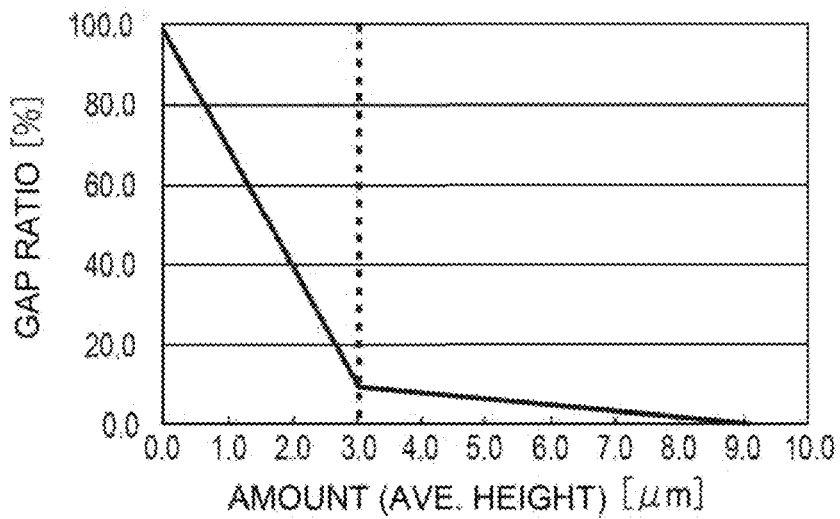

Fig. 16

IMAGE FORMING APPARATUS CONTROLLING TONER IMAGE OVERLAPPING RATIO

TECHNICAL FIELD

The present invention relates to an image forming apparatus, such as a copying machine, a facsimile machine or a printer, for obtaining a hard copy, including an image forming means for forming an unfixed toner image on a recording material by utilizing an electrophotographic process or the like of a transfer type or a direct type, and a fixing device for heat-fixing the toner image on the recording material.

BACKGROUND ART

A method of visualizing image information, via an electrostatic latent image, such as an electrophotographic type is currently used in various fields, such as the copying machine or the printer, with development of its technology and enlargement of market demand. Particularly, in recent years, demands for environmental response and cost reduction are increased, so that a toner consumption reducing technique has become very important. This technique is important also from the viewpoint of reduction in energy generated in a process in which the toner is fixed on the recording material. Particularly, in the image forming apparatus using the electrophotographic type for office use, the technique plays an important part also from a demand for energy saving.

On the other hand, with development of digitalization and colorization, the image forming apparatus of the electrophotographic type has started to be applied to some print fields; for example, commercialization of the image forming apparatus has started to become conspicuous in the fields of graphic arts and short-run printing such as print on-demand (POD). In the case where the entry of the image forming apparatus into the POD market is taken into consideration, the electrophotographic type has a feature of an on-demand property as digital to press printing, but involves many problems related to a color reproduction region, texture, image stability and media compatibility, in order to have market value as an output product. While addressing these problems, also from the viewpoint that awareness of the above-described cost reduction is raised and thus a cost per sheet of the output product is suppressed at a low level, the toner consumption reducing technique becomes important.

Here, with respect to the toner consumption reducing technique, the following proposals have been made.

In Japanese Laid-Open Patent Application (JP-A) 2004-295144, an absolute value of a charge potential of a photosensitive member is set at a low condition such as 350-550 V, and a toner having a high coloring power of 0.3-0.7 mg/cm$^2$ is used so that a toner amount on a transfer material after transfer can ensure a necessary image density after fixing. By this, downsizing, low cost and high-speed printing can be effected, so that a full-color image is stably formed over a long term.

In JP-A 2005-195670, as the toner, the following crystalline toner is used. That is, the crystalline toner of 0.02 log (Pa)/° C. or less in gradient of storage elastic modulus to temperature at Tm+20° C. to Tm+50° C. and 5 μm or less in weight-average particle size is used. Further, the crystalline toner of 0.35 mg/cm$^2$ or less in monochromatic toner maximum amount per unit area is transferred as the toner image onto a transfer sheet of 20 or more in texture index and then the toner image is fixed in a fixing time from 50 ms to 500 ms. By this, an image reduced in image non-uniformity such as non-uniformity of toner amount per unit area, uneven glossiness and color difference non-uniformity is formed.

In JP-A 2005-195674, as the toner, the following crystalline toner is used. That is, the crystalline toner of 5μ or less in weight-average particle size and 0.02 log(Pa)/° C. or less in gradient of storage elastic modulus to temperature at Tm+20° C. to Tm+50° C. is used. Further, the crystalline toner of 0.35 mg/cm$^2$ or less in monochromatic toner maximum amount per unit area is transferred as the toner image onto a transfer sheet and then the toner image is fixed at a fixing roller surface temperature of 130° C. or less. By this, a color image with less image roughening and excellent in fixing property can be formed.

The conventional toner consumption reducing technique, i.e., a method of enhancing the coloring power of the toner itself in which the toner consumption (amount) is reduced and at the same time, the toner is reduced in particle size can obtain a necessary image density while reducing the toner consumption. However, a new problem resulting from the reduction itself of the toner consumption has arisen.

DISCLOSURE OF THE INVENTION

The present inventors made a study by using a toner with a high coloring power so that a desired image density can be obtained simultaneously with reduction in maximum toner amount per unit area of a monochromatic toner. As a result, compared with the case where a toner with a low coloring power is used and the maximum toner amount per unit area is large, it was found that although the monochromatic color density is at the same level, a color reproduction region (range) of a secondary color or a multi-order color is narrowed. Therefore, in the case where the maximum toner consumption for the monochromatic color is decreased, when whether the toner on the recording material is in what melted state is sufficiently verified and observed, it was found that this decrease in color reproduction region of the secondary color or the multi-order color is caused by the following reasons. This cause will be described sequentially.

(Phenomenon that Background (Base Material) of Paper Cannot be Covered with Toner)

First, a phenomenon that a background of the paper (recording material) cannot be covered with the toner will be described. First, the toner amount and the paper base material covering state in the case of the monochromatic (single) color will be described. FIG. 7 includes relationship views of the toner amount and the paper base material covering state in the case of the monochromatic color. A difference in each of toner layer formation states when the amount of a toner 601 on paper 602 is large and small in the case of the monochromatic color is shown. In order to see overlaying of the toners (toner particles), a side view and a perspective view when the toner layer is viewed from its side and plan views for seeing the paper base material covering state with the toner were shown. In the order of (a), (b), (c) and (d), a change in state in which the toner amount is gradually decreased is shown.

In (a) and (b) (of FIG. 7) showing the state of the large toner amount, as is understood by seeing the plan views after the melting, it is understood that the paper base material is covered with the toner. It is understood that also in an unfixed state (before melt), there is no gap (spacing) between mutually adjacent toners and thus the paper base material is covered with the toner.

On the other hand, in (c) in which the toner amount is small, it is understood that the paper base material is covered after the melting at a portion where the toners are overlaid on each other or the adjacent toners contact each other two-dimensionally but the paper is seen also after the melting at a portion where there is the gap. In (d) showing the state of the further small toner amount, there is no overlaying of the toners and therefore it is understood that a degree of the covering of the paper base material with the toners after the melting is further degraded.

Of these, the toner is formed in a single layer at the portion where the gap between the toners is small and therefore even when there is the gap during un-fixing, it is understood that there is also a portion where the covering of the paper base material somewhat proceeds by melt-spread after the melting. However, with a larger gap between the toners, the paper base material covering state with the toner is degraded.

Next, the toner amount for the secondary color (superposition of the toner layers of two colors) and a secondary color formation state will be described. FIG. 8 includes relationship views with respect to the toner amount and "toner layer formation states for single color and secondary color". In addition to the toner 601 in the case of the single color (cyan in the description), a toner 601 of a second color (yellow in the description) is shown. In the figures when the toner amount is small, the toner layer formation state of the single color was shown in (a) and the toner layer formation state of the secondary color was shown in (b). Further, when the toner amount is large (i.e., when the toners are arranged with no gap), the toner layer formation state of the single color was shown in (c) and the toner layer formation state of the secondary color was shown in (d).

When the toner amount is small, it is understood that many gaps are present among the cyan toners 601 as a lower layer as shown in (a) and it is understood that the yellow toners 603 as an upper layer for the second color are placed on the gaps formed by the cyan toners 601 as shown in (b). Needless to say, when a particle-like substance such as the toner is formed in the layer, upper particles to be placed sink among lower particles.

Thus, on the cyan toners 601 as the lower layer where the gaps are present, the yellow toners as the upper layer are placed on the formed gaps. For that reason, when the toner is seen in a transmission state as shown in (transmission state) (b), it is understood that three portions of 604, 605 and 606 are formed. The portion 604 is a portion where only the yellow toners 603 as the upper layer are present. The portion 605 is a portion where only the cyan toners 601 as the lower layer are present. The portion 606 is an overlaid portion where the yellow toners 603 as the upper layer and the cyan toners 601 as the lower layer are overlaid to form green.

On the other hand, when the toner amount is large (when the toners are arranged with no gap), as shown in (c), it is understood that the upper base material is almost covered because with respect to the cyan toners 601 as the lower layer, the adjacent toners contact each other. Further, as shown in (d), the yellow toners 603 as the upper layer for the second color are placed on the gaps formed by the cyan toners 601 similarly as in (b). Further, it is understood that the yellow toners 603 placed on the yellow toners 603 are also placed on the gaps formed by the yellow toners themselves.

On the lower layer in the single lower layer state of (c) in which the paper has already been firmly covered, the yellow toners 603 themselves located at the upper layer are in a state in which the yellow toners mutually cover the lower layer. For that reason, as is understood by seeing the transmission state of (d), the state is different from the transmission state of (b) when the toner amount is small. That is, it is understood that many portions where the yellow toners 603 are present constitute the overlaid portion 606 where the yellow toners 603 as the upper layer and the cyan toners 601 as the lower layer are overlaid to form green.

Thus, when the toner amount is large, many portions constitute the overlaid portion 606 where the secondary color is formed satisfactorily. On the other hand, when the toner amount is small, with a decreasing toner amount, the portions (604, 605) where only the single color is present in the gap in each of the upper layer and the lower layer are increased, so that the overlaid portion 606 where the secondary color is formed satisfactorily is decreased. For that reason, when the toner amount is intended to be decreased compared with the conventional toner amount, color development of the secondary color is degraded and at the same time, also at the single color formation portions, the degree of the covering of the paper base material is lowered, so that a reproducing range of the color region is extremely lowered.

Here, an ideal state for forming the toner layer with a small gap in a smaller toner amount will be described. FIG. 9 includes views showing the toner layer formation states when the toner amount is small (when there is the gap) and when the toner particles are arranged in the single layer with no gap. (a) shows the case where the toner amount is remarkably small with respect to a flat surface, and the presence of many gaps cannot be avoided. As shown in (b), also in the case where the toner amount is somewhat increased compared with (a), when there are a three-dimensionally overlaid portion of the mutual toners and the gap-generated portion, the degree of covering of the paper base material is lowered and thus it is difficult to obtain good overlaying also during the secondary color formation.

Therefore, when the case where the toner particles are ideally arranged in the plane, as shown in (e), is compared with the arrangement state of (b), the gap is decreased but the toner particles have irregular shapes. For that reason, even when all the toner particles contact each other, it is understood that there is a large gap portion.

Similarly, also in the case where the spherical toner particles have a particle size distribution as shown in (d), when the toner particles which enter under the large-sized toner particles and are arranged are taken into account, the gap is liable to increase. That is, as shown in (c), in the case where the spherical toner particles with the same particle size are arranged in a closed-packed state, the toner particles can be arranged on the flat surface most efficiently.

Further, needless to say, in this state, all the adjacent toner particles contact each other, so that the paper base material can be most covered with the particles with the same volume. For example, in the case where elliptical spherical toner particles and the like are well arranged in a long diameter direction, it would be considered that the degree of covering higher than that in (c) can be achieved but, when the toner particles are arranged in a short diameter direction, the degree of covering is lower than that in (c). For that reason, in the case where an average arrangement of the elliptical spherical toner particles is considered, compared with the spherical toner particles, the degree of covering results in a lower value.

Next, the toner layer formation state with respect to the toner amount (toner density) of the spherical toner particles with the same particle size capable of creating the ideal arrangement state will be described.

FIG. 10 shows the toner layer formation states with respect to the toner amount (toner density) of the spherical toner particles with the same volume. When the single color layer formation states are compared, as shown in (a), the toner particles are in the state in which all the adjacent toner particles contact each other at the time of the closest-packed state and therefore the gap is smallest. On the other hand, it is understood that the gap is gradually increased with a decreasing toner amount in the order of (b), (c) and (d).

When the secondary color formation states (plan views) are seen, it is understood that the yellow toners 603 as the upper layer for the second color are placed in the gaps formed by the cyan toners 601 as the lower layer irrespective of the toner amount. Here, when the secondary color formation states (side views) are seen, with decreasing toner amount, the upper layer toners increasingly enter the gaps of the lower layer toners.

In (a), the upper layer toners are in a state in which they are placed on the lower layer toners and other hand, with a larger gap in the order of (b), (c) and (d), the upper layer toners are in a state in which they are caught in the gaps rather than the placed state. Further, with the larger gap, the upper layer toners are located at a lower position. That is, it is understood that the upper layer toners enter between the lower layer toners. Thus, it is well understood that the upper layer toners enter between the lower layer toners in a positional relation manner with the larger gap in the unfixed state.

Further, the transmission state will be described. For explanation, in order to see the overlaid state in detail, the description will be made by using FIG. 11. It is understood that on a gap 607 formed among three cyan toners (toner particles) 601 adjacent to one another as the lower layer, the yellow toner 603 as the upper layer is placed. On the other hand, it is also understood that in a gap 608 formed among three toners (toner particles) adjacent to one another, which are the yellow toners 603 which form the upper layer, the lower layer cyan toner 601 is located.

In such a state, when the toner layer is melted, the upper layer yellow toner 603 enters the gap 607, formed by the lower layer cyan toners 601, in a direction of an arrow (↓). Further, the lower layer cyan toner 601 enters the gap 608, formed by the upper layer yellow toners 603, in a direction of an arrow (↑). By this, each of the single color portions (604, 605) is generated to impede enlargement of a good overlaid portion (green mixed-color portion) 606 and therefore the color development (degree) of the secondary color is lowered. As shown in FIG. 10, with the decreasing toner amount in the order of (b), (c) and (d), the gap is increased, and therefore this impedance state becomes worse.

Next, various parameters at the time of the ideal arrangement state will be described. FIG. 12 shows the various parameters in the ideal arrangement state. When the particle size (diameter) of the toner (particle) is L (μm), a toner volume is Vo (μm³), a planar toner particle projected area is So (μm²) and a unit area in which one toner particle is contained is $$S_\blacksquare [\mu m^2]$$

and these parameters are represented as follows, respectively.

$$V_\circ = \frac{4}{3}\pi\left(\frac{L}{2}\right)^3$$

$$S_\circ = \pi\left(\frac{L}{2}\right)^2$$

$$S_\blacksquare = \frac{\sqrt{3}}{2}L^2$$

From these (parameters), a toner amount per unit area H (μm) (volume per unit area=average height) of a single layer (single color) when the toners are arranged in the closest-packed state is calculated as follows.

$$H = \frac{V_\circ}{S_\blacksquare}$$

$$= \frac{4}{3}\pi\left(\frac{L}{2}\right)^3 \cdot \frac{2}{\sqrt{3}L^2}$$

$$= \frac{\pi L}{3\sqrt{3}}$$

FIG. 13 is a graph, from the above, showing a relationship between the toner particle size and the toner amount per unit area (average height) in the ideal arrangement state. In the figure, a solid line (-) represents the ideal arrangement state. A zone I shows a range in which the toner amount per unit area is larger than that in the ideal arrangement state, and a zone II shows a range in which the toner amount per unit area is smaller than that in the ideal arrangement state. That is, in the zone II, the toner amount with respect to the paper is insufficient and thus the gap occurs. Here, the gap generated during the ideal arrangement, i.e., a ratio T (%) of the gap when the toner particles are arranged in the closest-packed state (gap amount per unit area) (FIG. 12), is calculated as follows. (FIG. 12) is calculated as follows.

$$T = \left(1 - \frac{S_\circ}{S_\blacksquare}\right) \times 100$$

$$= \left(1 - \pi\left(\frac{L}{2}\right)^2 \cdot \frac{2}{\sqrt{3}L^2}\right) \times 100$$

$$\approx 9.31$$

This means that the ratio T (%) is always 9.31(%) in the toner particle size and the toner amount per unit area (average height) (solid line (-) in the graph) providing the ideal arrangement state shown in FIG. 13. In other words, irrespective of the toner amount, the gap generated during the ideal arrangement state is 9.31(%).

Here, the case where the toner amount is larger than the toner amount in the ideal arrangement state will be described. FIG. 14 includes views showing the closed-packed lamination state of the toners (toner particles) when the toner amount is increased. (a) shows a state in which the toners 611 for the first layer are arranged in the closed-packed state. A hexagon 612 is one unit area and by considering a state in which gaps A 613 and gaps B 614 in this hexagon are out of sight, it is possible to consider the toner amount per unit area when the paper is covered at 100%.

In (a), the gaps A 613 and the gaps B 614 are present and this ratio is 9.31% per unit area. (b) and (c) show a state in which the toners 615 for the second layer are placed, so that it is understood that the toners 615 cover the gaps A 613. Further, (d) and (e) show a state in which toners 616 for a third layer are placed. It is understood that the gaps B 614 are covered and thus the paper is covered at 100%.

Next, various parameters in the case where the toner amount is below the toner amount in the ideal arrangement state will be described. FIG. 15 shows the various parameters in a state in which the toner amount is below the toner amount in the ideal arrangement state.

When the particle size (toner diameter) is L (μm), the toner volume Vo (μm3) and the toner projection area So (μm3) are the same as those in FIG. 12. However, here, a gap t (μm) is generated between the toners and therefore a unit area in which a portion corresponding to one toner (particle) is contained is $S_\square$ (μm2) and is represented as follows.

$$S_\square = \frac{\sqrt{3}}{2}(L+t)^2$$

From these, an amount per unit area of the single layer (one color) $H_\square$ (μm) (volume per unit area=average height) when the toners are uniformly arranged with the gap t (μm) is calculated as follows.

$$H_\square = \frac{V_o}{S_\square}$$
$$= \frac{4}{3}\pi\left(\frac{L}{2}\right)^3 \cdot \frac{2}{\sqrt{3}(L+t)^2}$$
$$= \frac{\pi L^3}{3\sqrt{3}(L+t)^2}$$

Further, an equation obtained by organizing a calculated ratio of the gap $T_\square$ (%) (gap amount per unit area) (FIG. 15), generated when the toners are uniformly arranged with the gap t (μm), by deleting the gap (t) (μm) between the toners by the above equation is as follows.

$$T_\square = \left(1 - \frac{S_o}{S_\square}\right) \times 100$$
$$= \left(1 - \pi\left(\frac{L}{2}\right)^2 \cdot \frac{2}{\sqrt{3}(L+t)^2}\right) \times 100$$
$$= \left(1 - \frac{3H_\square}{2L}\right) \times 100$$

FIG. 16 is a graph showing a relationship between the toner amount per unit area (average height) and the gap ratio when the toner particle size is 6 (μm), as an example, from the above relation formula. In the figure, a boundary line ( . . . ) is dots showing the amount per unit area during the ideal arrangement state. In the case where the toner amount is smaller than the boundary line, the line shows a range in which the gap is generated and is a curve obtained on the basis of the above equation.

At a portion where the toner amount is larger than the boundary line, as described with reference to FIG. 14, the line is a curve obtained from the fact that the gap is 0% (coverage: 100%) when the three layers are laminated in the ideal state. From this curve, when the toner amount per unit area is below the ideal arrangement (boundary line), the gap is abruptly increased, i.e., the coverage is lowered. In a range in which the toner amount per unit area exceeds the boundary line, i.e., when the toner amount becomes large, when the toner amount per unit area exceeds the ideal arrangement state, it is understood that a change in amount of decrease in gap becomes small (improvement in coverage becomes dull).

Here, as an example, the state when the toner particle size is 6 (μm) is described but needless to say, the change with the boundary line as a boundary is not limited thereto but is true for all of the particle sizes in the toner particles sizes within a normal use range.

The present invention has been accomplished in view of such a phenomenon. Further, in the zone II in FIG. 13 and in the range in which the toner amount is smaller than the boundary line ( . . . ) in FIG. 16, i.e., in the range in which the toner amount is less than the ideal arrangement state (closed-packed), even when there is the gap between the toners generated in principle, more proper color reproduction is realized. Specifically, the paper coverage in the single color and the color development of the secondary color by the satisfactory overlaying of different toners are improved.

On the other hand, as in a conventional embodiment in which a sufficient toner amount is present with respect to the toner particle size, in the zone I in FIG. 13 in the range in which the toner amount is less than the boundary line ( . . . ) in FIG. 16, the toner amount is sufficient. For that reason, in a state in which loss of the color development due to the toner arrangement is not generated, an effect of the present invention cannot be achieved.

Up to now, in order to consider the toner particle arrangement state, with respect to the toner amount per unit area, the "toner volume per unit area (pm) (=average height)" is used for the description but generally when the toner amount per unit area is measured and controlled, a "weight per unit area (mg/cm2)" is used. In accordance with this, when a density ρ (g/cm3) is taken into consideration in the above formula representing the ideal arrangement state (the closest-packed state of the spherical toner particles) described above, the toner amount per unit area can be converted into a toner amount per unit area A (mg/cm2) represented by the following formula. In the formula, "1/10" is a factor for unit alignment.

$$A = \rho \times H$$
$$= \rho \times \frac{1}{10} \times \frac{\pi L^3}{3\sqrt{3}\, L^2}$$
$$= \frac{\rho \pi L}{30\sqrt{3}}$$

The present invention has been accomplished in view of the above-described circumstances and its object is to provide an image forming apparatus which obtains a wide color reproduction region by making a degree of color overlaying so as not to decrease even in the case where a toner consumption (amount) is decreased.

An object of the present invention is to provide an image forming apparatus capable of improving the degree of color overlaying of different color toners.

The present invention provides an image forming apparatus, comprising:

a first image forming portion for forming a toner image on a recording material under a condition satisfying a relationship: $A1 < (\rho 1 \Pi L1)/30\sqrt{3}$ where a specific gravity of a toner of a first color is ρ1 (g/cm³), a weight-average particle size is L1 (μm), and a maximum toner amount per unit area of the toner to be formed on the recording material before fixing is A1 (mg/cm²);

a second image forming portion for forming a toner image on a recording material under a condition satisfying a relationship: $A2 < (\rho 2 \Pi L2)/30\sqrt{3}$ where a specific gravity of a toner of a second color is ρ2 (g/cm³), a weight-average particle size is L2 (μm), and a maximum toner amount per unit area of the toner to be formed on the recording material before fixing is A2 (mg/cm²); and a fixing device for fixing the toner images on the recording material so that when the image forming apparatus forms the toner images on the recording material by superposing, on a first toner image formed with the maximum toner amount per unit area A1 by the first image forming portion, a second toner image formed with the maximum toner amount per unit area A2 by the second image forming portion, a first-and-second-toner-image-overlaying ratio is 84% or more.

BRIEF DESCRIPTION OF THE DRAWINGS

FIG. 15 is a view for illustrating various parameters when a paper surface cannot be covered with toners.

FIG. 16 shows the toner amount per unit area and a gap ratio when a toner particle size is 6 ($\mu m$).

BEST MODE FOR CARRYING OUT THE INVENTION

First Embodiment

Image Forming Portion

Figure 1:
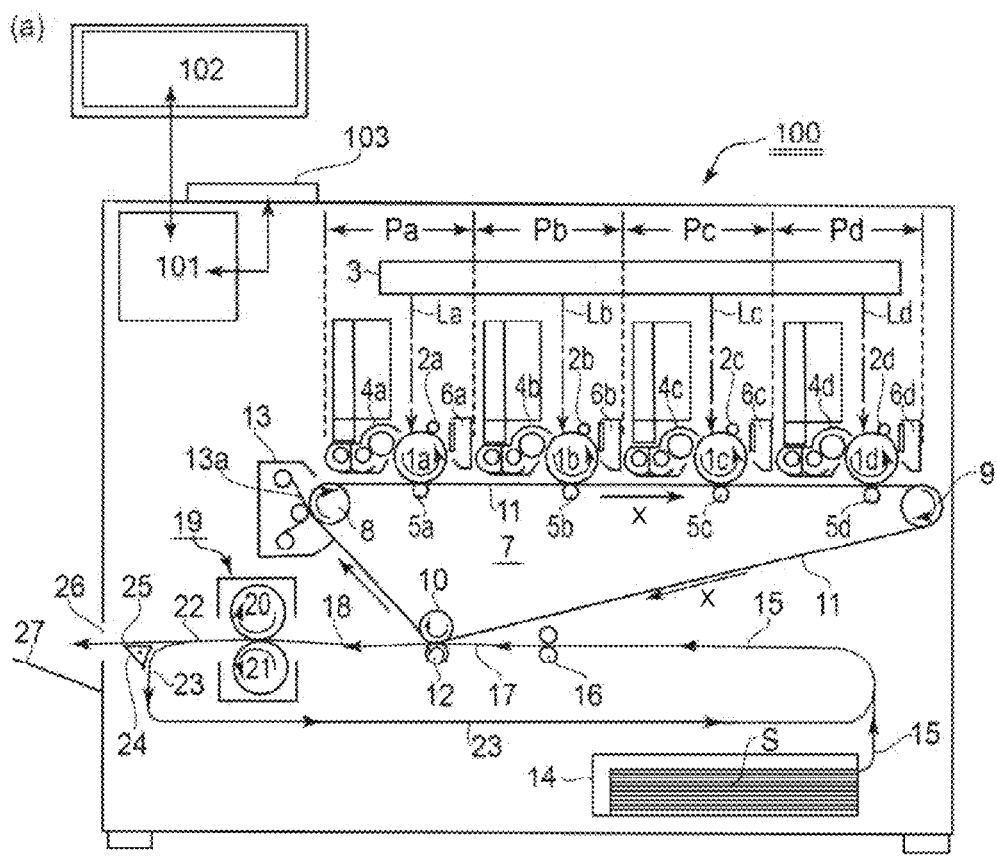
In FIG. 1, (a) is a schematic illustration of the image forming apparatus in an embodiment, and (b) is a schematic cross-sectional view of a principal part of a fixing device.
Figure 1:
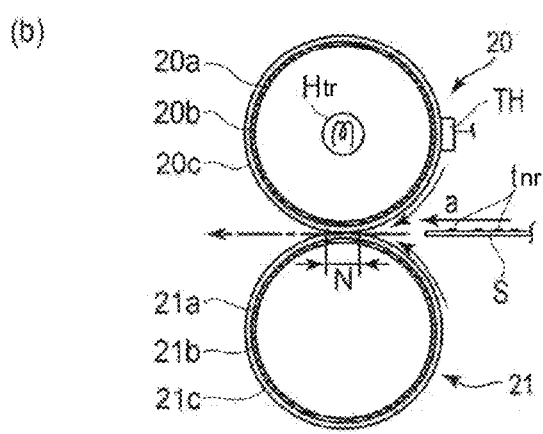

Part (a) of FIG. 1 is a schematic illustration of image forming apparatus 100 in this embodiment. This apparatus 100 is a four color-based full-color electrophotographic laser printer and is capable of forming, on a recording material S, a full-color image corresponding to electrical image information inputted from an external host device 102 connected to a control circuit portion (CPU) 101 in a communicatable manner and is capable of outputting the recording material S. The apparatus 102 is, e.g., a personal computer, an image reader, a facsimile machine or the like. The circuit portion 101 sends signals to and receives signals from the device 102 and an operating portion 103, thus managing an image forming sequence control.

Inside the main assembly of the apparatus 100, from the upper-left side toward the (upper-)right side on the drawing, first to fourth image forming portions Pa, Pb, Pc and Pd are juxtaposed. Each of the image forming portions is an electrophotographic process mechanism portion of a laser scanning exposure type, and the image forming portions include drum-type electrophotographic photosensitive members (hereinafter referred to as drums) 1 (1a, 1b, 1c, 1d), respectively, as an image bearing member. Further, the image forming portions include, as process means acting on the drums 1, primary chargers 2 (2a, 2b, 2c, 2d), developing devices 4 (4a, 4b, 4c, 4d), primary transfer chargers 5 (5a, 5b, 5c, 5d) and drum cleaners 6 (6a, 6b, 6c, 6d).

The drum 1 is rotationally driven in the counterclockwise direction of an arrow at a predetermined speed (process speed). The primary charger 2 is a charging means for electrically charging the surface of the rotating drum 1 to a predetermined polarity and a predetermined potential uniform, and is a contact charging roller in this embodiment.

The developing device 4 is a developing means for developing an electrostatic latent image, formed on the surface of the drum 1, as a chromatic color toner image, with a developer (chromatic color toner: color toner). Each of the developing devices 4 includes a sleeve for carrying the developer. In the apparatus 100 of this embodiment, the first forming portion Pa is an image forming portion for forming a toner image of yellow (Y color) on the drum 1a, and a Y color toner is accommodated in the developing device 4a. The second image forming portion Pb is an image forming portion for forming a toner image of magenta (M color) on the drum 1b, and an M color toner is accommodated in the developing device 4b.

The third forming portion Pc is an image forming portion for forming a toner image of cyan (C color) on the drum 1c, and a C color toner is accommodated in the developing device 4c. The fourth image forming portion Pd is an image forming portion for forming a toner image of black (Bk color) on the drum 1d, and a Bk color toner is accommodated in the developing device 4d.

The primary charger 5 is a transfer means for transferring the toner image formed on the drum 1 onto an intermediary transfer belt 11 described later, and a transfer roller (contact charging roller) is used in this embodiment. The drum cleaner 6 is a cleaning means for cleaning the drum surface by removing a residual deposited matter such as a residual toner or the like from the surface of the drum 1 after the primary transfer of the toner image onto the belt 11.

At an upper portion of the image forming portions Pa, Pb, Pc and Pd, a laser scanner unit 3 is provided. The unit 3 is an image exposure means for subjecting the primary-charged surfaces of the respective drums 1 to scanning exposure to laser lights La, Lb, Lc, Ld modulated correspondingly to image information to form the electrostatic latent image.

The unit 3 scans the drum surface with the laser light La, Lb, Lc, or Ld emitted from a light source device by rotating the polygon mirror and deflects the beam (flux) of the scanning light by a reflection mirror and then focuses the beam on a generatrix line of the drum 1 by the fθ lens, thus effecting light exposure. By this, on the surface of each drum 1, the electrostatic latent image depending on an image signal is formed. Further, on the basis of the electrostatic latent image, a voltage is applied to the sleeve provided to the developing device, so that the toner image is formed by a potential difference between a potential of the electrostatic latent image and a potential of the sleeve.

At a lower portion of the first to fourth image forming portions Pa, Pb, Pc and Pd, an intermediary transfer belt unit 7 is provided. The unit 7 includes parallel three rollers consisting of a driving roller 8 in the first image forming portion Pa side, a turn roller 9 in the fourth image forming portion Pd side and a secondary transfer inner roller 10 located between the roller 8 and the roller 9 and below the both rollers 8 and 9. Further, the unit 7 includes an endless and flexible intermediary transfer belt 11 extended and stretched among the three rollers. The primary transfer roller 5 at each image forming portion P is provided inside the belt 11 and contacts the lower surface of the corresponding drum 1 via an upper-side belt portion between the rollers 8 and 9.

At each image forming portion P, a contact nip (portion) between the drum 1 and the belt 11 is a primary transfer portion. To the secondary transfer inner roller 10, a secondary transfer outer roller 12 is contacted via the belt 11. A contact nip between the belt 11 and the roller 12 is a secondary transfer portion. At a portion where the belt 11 is partly wound about the roller 8, a belt cleaner 13 is disposed.

The cleaner 13 is a cleaning means for cleaning the surface of the belt 11. In this embodiment, as a cleaning member 13a, a web cleaning device using a cleaning web (nonwoven fabric) is used. A secondary transfer residual toner and other foreign matter on the belt 11 are wiped off by bringing the web 13a into contact to the surface of the belt 11.

Full-color image formation on the recording material S is as follows. An image forming operation is started after image data and user setting information such as a size of the recording material used or a print number are transferred from the device 102 and the operating portion 103 to the circuit portion 101. The circuit 101 causes each image forming portion P to perform the image forming operation on the basis of a color separation image signal of the inputted color image information.

Further, by the roller 8, the belt 11 is circulation-moved and driven in the clockwise direction of an arrow X at a predetermined speed. Further, a sheet feeding mechanism portion (not shown) is driven with predetermined control timing, so that one sheet of the recording material S is separated and fed from a feeding cassette 14 in which the recording material S is stacked and accommodated and passes through a conveying path 15 to be conveyed to a registration roller pair 16.

In this apparatus 100 of this embodiment, an unfixed toner image of each monochromatic (single) color is once fixed on the recording material and thereafter an unfixed toner image of another monochromatic color is fixed thereon. Then, such an operation that a fixing step is performed again is effected repeatedly, so that the image formation/fixing step for four colors ae is performed to obtain a full-color output image.

Further, in order to successively form and fix the respective single color toners on the recording material, the first color was Bk (color), the second color was C (color), the third color was M (color), and the fourth color was Y (color). That is, from a side color to the surface of the recording material S, the Bk toner image, the C toner image, the M toner image and the Y toner image are successively formed by being image-formed and fixed, so that the Y toner image is image-formed/fixed at an outermost surface.

That is, the apparatus 100 of this embodiment applies, four times by changing the toner color to Bk, C, M and Y, to the same recording material S, the image formation/fixing step in which the unfixed toner image is formed with the chromatic color toner on the recording material S and its toner image is fixed on the recording material by being heated and pressed.

By this, on the recording material, an image of overlaying of the toner images of Bk, C, M and Y is formed. Further, the toner amount per unit area satisfying $A < (\rho \Pi L)/30\sqrt{3}$ when the toner amount per unit area with respect to the recording material is A (mg/cm$^2$) when the unfixed toner image is formed on the recording material S is the maximum toner amount per unit area in formation of the unfixed toner image with each color toner. Here, $\rho$ is specific gravity (g/cm$^3$) of the toner and L is a weight-average particle size ($\mu$m) of the toner. In this embodiment, the toner having the specific gravity $\rho$ of 1.1 (g/cm$^3$) and the weight-average particle size L of 6.0 ($\mu$m) was used and was set so that the maximum toner amount per unit area of the unfixed toner on the recording material was 0.3 (mg/cm$^2$). In this embodiment, as a method of setting the maximum toner amount per unit area at 0.3 (mg/cm$^2$), a method of adjusting a potential difference between a potential on the drum and a potential of the sleeve may be cited. In this embodiment, a maximum toner amount per unit area A1 for Y, a maximum toner amount per unit area A2 for Bk, a maximum toner amount per unit area A3 for Bk and a maximum toner amount per unit area A4 for Bk were all set at 0.3 (mg/cm$^2$). However, the present invention is not limited to this constitution but may also be a constitution in which the maximum toner amount per unit area satisfying $A < (\rho \Pi L)/30\sqrt{3}$ is set for each color.

Further, this embodiment is characterized in that the above-described unfixed toner image is fixed so that a region in which the colors of the respective color toners are seen in an overlaid state is present at 84% or more. By this constitution, even in the case where the toner consumption is decreased, the degree of overlaying of the colors is prevented from being decreased, so that it is possible to provide an image forming apparatus which obtains the wide color reproducing region. Hereinafter, this will be described in detail.

1) Formation of Bk Toner Image for First Color

The circuit portion 101 causes, of the first to fourth image forming portions Pa, Pb, Pc and Pd, only the fourth image forming portion Pd for forming the Bk toner image to perform the image forming operation. With respect to other image forming portions, the drum 1 is only rotationally driven (blank rotation) and is not subjected to the image forming operation. The drum 1 and the belt 11 at each image forming portion are driven at the same peripheral speed. The circuit portion 101 executes processes of charging, exposure and developing at the fourth image forming portion Pd, so that the Bk toner image corresponding to a Bk color component image of the full-color image providing the maximum toner amount per unit area of 0.3 (mg/cm$^2$) of the unfixed toner on the recording material is formed on the surface of the drum 1d.

The Bk toner image is successively primary-transferred from the drum 1d onto the surface of the belt 11 at the primary transfer portion. This transfer is effected by an electric field generated by applying, to the roller 5d, a primary transfer bias of an opposite polarity to a charge polarity of the toner and of a predetermined potential and (effected) by nip pressure at the primary transfer portion. The surface of the drum 1 d after the transfer of the Bk toner image onto the belt 11 is cleaned by the cleaner 6d and is repetitively subjected to the image formation. The Bk toner image primary-transferred on the surface of the belt 11 is conveyed to the secondary transfer portion by subsequent movement of the belt 11.

On the other hand, the recording material S fed from the cassette 14 is caught by a nip of the roller pair 16 in a rotation stop state at its leading end portion, thus being subjected to oblique movement correction. Then, the roller pair 16 is driven with predetermined control timing, so that the recording material S is passed through the conveying path 17 by the roller pair 16 and is fed to the secondary transfer portion. By this, in synchronism with timing when a leading end portion of the Bk toner image on the belt 11 reaches the secondary transfer portion, the leading end portion of the recording material is introduced into the secondary transfer portion, so that the recording material S is nip-conveyed through the secondary transfer portion.

By this, the Bk toner image on the belt 11 is successively secondary-transferred onto the surface of the recording material S at the secondary transfer portion. This transfer is effected by an electric field generated by applying, to the roller 12, a secondary transfer bias of the opposite polarity to the toner charge polarity and of a predetermined potential and (effected) by nip pressure at the secondary transfer portion. The recording material S coming out of the secondary transfer portion is separated from the surface of the belt 11 and is passed through a conveying path 18 and then is introduced into a fixing device 19. The surface of the belt 11 after the separation of the recording material is cleaned by a cleaner 13 and is repetitively subjected to the image formation.

The fixing device 19 is an image fixing means for fixing the unfixed toner image, as a fixed image, on the recording material S by heating and pressing the unfixed toner image, and in this embodiment, a heat-roller fixing device is used. Part (b) of FIG. 1 is a schematic cross-sectional view of a principal part of the fixing device 19.

The fixing device 19 forms a fixing nip N by vertically press-contacting parallel two rollers consisting of a fixing roller (fixing member) 20 and a pressing roller (pressing member) 21. The roller 20 is a roller of an outer diameter φ of 60 mm prepared by forming a 2 mm-thick silicone rubber layer 20b on an outer peripheral surface of a core metal 20a of Fe having an inner diameter φ of 54.6 mm, an outer diameter φ of 56.0 mm and a thickness of 0.7 mm and further by coating a 30 μm-thick PFA tube 20c on its surface.

Also the roller 21 is a roller similar to the roller 20. That is, the roller 21 is a roller of an outer diameter φ of 60 mm prepared by forming a 2 mm-thick silicone rubber layer 21b on an outer peripheral surface of a core metal 21a of Fe having an inner diameter φ of 54.6 mm, an outer diameter φ of 56.0 mm and a thickness of 0.7 mm and further by coating a 30 μm-thick PFA tube 21c on its surface.

The roller 20 and the roller 21 are vertically arranged in parallel and both rollers are pressed under a total pressure of about 80 kgf (about 784 N) to form the fixing nip N with a predetermined width with respect to a recording material conveyance direction. The rollers 20 and 21 are rotationally driven in the arrow directions. Inside the core metal 20a of the roller 20, a heater (heat source) Htr such as a halogen lamp is provided. The heater Htr generates heat by being supplied with electric power from an electric power source portion (not shown). By this heat generation, the roller 20 is internally heated.

Further, a surface temperature of the roller 20 is detected by a temperature detecting element TH such as a thermistor and electrical information on a detected temperature is inputted into the circuit portion 101. The circuit portion 101 controls supplying electric power from the electric power source portion to the heater Htr so that detected temperature information inputted from the element is kept at electrical information corresponding to a predetermined fixing temperature. The circuit portion 101 effects temperature control so that the surface temperature of the roller 20 is kept at the predetermined fixing temperature.

The rollers 20 and 21 are rotationally driven and in a state in which the roller 20 is raised in temperature to the predetermined fixing temperature and is temperature-controlled, the recording material S carrying the unfixed toner image tnr is introduced into the fixing nip N and is nip-conveyed through the nip N. By this, the unfixed toner image tnr is fixed as a fixed image on the recording material surface by heating and pressure application at the nip N. In this embodiment, by a constitution in which a driving force from a motor is transmitted to the roller 20, the roller 20 is driven and rotated, so that the roller 21 is rotated by the rotation of the roller 20. That is, a peripheral speed difference between the roller 20 and the roller 21 is substantially 0%. As a result, also a moving speed difference between a moving speed of the roller 20 and a moving speed of the recording material in the nip can be made substantially 0%. In this embodiment, when the recording material on which the image is formed passes through the nip, the above-described condition is employed.

The recording material S coming out of the nip N is separated from the surface of the roller 20 and is introduced from a conveying path 22 into a re-circulation conveying path (conveying path for fixing of plural times) 23. This introduction of the recording material S from the conveying path 22 to the recirculation conveying path 23 is effected by a flapper 24 switched into a first attitude. This recording material S is a recording material on which the fixed Bk toner image is formed and enters the conveying path 15 again from the conveying path 23, thus being conveyed to the registration roller pair 16. Then, the recording material S is subjected to the oblique movement correction by being caught at its leading end portion by the nip of the roller pair 16 in the rotation step state, thus being stopped.

2) Formation of C Toner Image for Second Color

Next, the circuit portion 101 executes, at the third image forming portion Pc, the procedures of the charging, the exposure and the development with respect to the drum 1c to form the C toner image, corresponding to a C color component image of the full-color image providing the maximum toner amount per unit area of 0.3 (mg/cm$^2$) of the unfixed toner on the recording material, on the surface of the drum 1c.

With respect to other image forming portions, the drum 1 is only rotationally driven and is not subjected to the image forming operation.

The C toner image formed on the drum 1c is successively primary-transferred from the drum 1d onto the surface of the belt 11 at the primary transfer portion. The C toner image primary-transferred on the surface of the belt 11 is conveyed to the secondary transfer portion by subsequent movement of the belt 11.

Then, the roller pair 16 is driven with predetermined control timing, so that the recording material S on which the fixed Bk toner image has already been formed is passed through the conveying path 17 by the roller pair 16 and is fed to the secondary transfer portion. By this, the C toner image on the belt 11 is successively secondary-transferred superposedly onto the Bk toner image-formed surface of the recording material S at the secondary transfer portion. The recording material S coming out of the secondary transfer portion is separated from the surface of the belt 11 and is passed through a conveying path 18 and then is introduced into a fixing device 19, so that the unfixed C toner image is fixed as a fixed image on the recording material surface by heating and pressure application in the nip N.

The recording material S coming out of the nip N is separated from the surface of the roller 20 and is introduced from a conveying path 22 into a re-circulation conveying path 23. Then, the recording material S enters the conveying path 15 again and is subjected to the oblique movement correction by being caught at its leading end portion by the nip of the roller pair 16 in the rotation step stop state, thus being stopped.

3) Formation of M Toner Image for Third Color

Next, the circuit portion 101 executes, at the second image forming portion Pb, the procedures of the charging, the exposure and the development with respect to the drum 1b to form the M toner image, corresponding to a M color component image of the full-color image providing the maximum toner amount per unit area of 0.3 (mg/cm$^2$) of the unfixed toner on the recording material, on the surface of the drum 1b.

With respect to other image forming portions, the drum 1 is only rotationally driven and is not subjected to the image forming operation.

The M toner image formed on the drum 1b is successively primary-transferred from the drum 1d onto the surface of the belt 11 at the primary transfer portion. The M toner image primary-transferred on the surface of the belt 11 is conveyed to the secondary transfer portion by subsequent movement of the belt 11.

Then, the roller pair 16 is driven with predetermined control timing, so that the recording material S on which the fixed Bk and C toner images have already been formed is passed through the conveying path 17 by the roller pair 16 and is fed to the secondary transfer portion. By this, the C toner image on the belt 11 is successively secondary-transferred superposedly onto the already-fixed Bk and C toner images-formed surface of the recording material S at the secondary transfer portion. The recording material S coming out of the secondary transfer portion is separated from the surface of the belt 11 and is passed through a conveying path 18 and then is introduced into a fixing device 19, so that the unfixed M toner image is fixed as a fixed image on the recording material surface by heating and pressure application in the nip N.

The recording material S coming out of the nip N is separated from the surface of the roller 20 and is introduced from a conveying path 22 into a re-circulation conveying path 23. Then, the recording material S enters the conveying path 15 again and is subjected to the oblique movement correction by being caught at its leading end portion by the nip of the roller pair 16 in the rotation stop state, thus being stopped.

4) Formation of Y Toner Image for Fourth Color

Next, the circuit portion 101 executes, at the first image forming portion Pa, the procedures of the charging, the exposure and the development with respect to the drum 1a to form the Y toner image, corresponding to a Y color component image of the full-color image providing the maximum toner amount per unit area of 0.3 (mg/cm$^2$) of the unfixed toner on the recording material, on the surface of the drum 1a.

With respect to other image forming portions, the drum 1 is only rotationally driven and is not subjected to the image forming operation.

The Y toner image formed on the drum 1a is successively primary-transferred from the drum 1d onto the surface of the belt 11 at the primary transfer portion. The Y toner image primary-transferred on the surface of the belt 11 is conveyed to the secondary transfer portion by subsequent movement of the belt 11.

Then, the roller pair 16 is driven with predetermined control timing, so that the recording material S on which the Bk toner image, the C toner image and the M toner image have already been formed and fixed is passed through the conveying path 17 by the roller pair 16 and is fed to the secondary transfer portion. By this, the Y toner image on the belt 11 is successively secondary-transferred superposedly onto the already-fixed Bk, C and Y toner images-formed surface of the recording material S at the secondary transfer portion. The recording material S coming out of the secondary transfer portion is separated from the surface of the belt 11 and is passed through a conveying path 18 and then is introduced into a fixing device 19, so that the unfixed Y toner image is fixed as a fixed image on the recording material surface by heating and pressure application in the nip N.

Then, the recording material S coming out of the nip N is separated from the surface of the roller 20 and is introduced from a conveying path 22 into a conveying path 25 side, thus being discharged, as a four-color-based full-color image-formed product (output product) from a discharge opening 26 onto a discharge tray 27. The introduction of the recording material S from the conveying path 22 to the conveying path 25 is effected by the switching of the flapper 24 into a second attitude.

(Relationship Between Toner Characteristic and Melted State)

Here, a characteristic of the toners used in this embodiment and a melted state of the toners in the fixing step will be described. First, as the toners in this embodiment, those using polyester-based resin were used. As a toner manufacturing method, a pulverization method or a method (polymerization method), for directly manufacturing the toners in a medium, such as suspension polymerization, interfacial polymerization, dispersion polymerization, or the like may be used. In this embodiment, the toners manufactured by the pulverization method were used. Incidentally, the ingredients and the manufacturing method of the toners are not limited thereto. As the respective color toners of Y, M, C and Bk, it is possible to use toners constituted by transparent thermoplastic resin materials which contain colorants for the respective colors. In this embodiment, color toners using, as a binder (resin), a polyester resin material having a temperature-melt viscosity property of the toner as shown in (a) of FIG. 2 was used.

Further, as the toners in this embodiment, those of 1.1 (g/cm$^3$) in specific gravity ρ and 6.0 (μm) in weight-average particle size L were used, and the maximum toner amount per unit area of the unfixed toner was set so as to be 0.3 (g/cm$^2$). Here, a relationship among the specific gravity ρ of the toner, the weight-average particle size L and the toner amount per unit area A of the unfixed toner is not limited to the above setting if it satisfied:

$$A<(\rho\Pi L)/30\sqrt{3}.$$

Next, a relationship among the melted state of the toner, the toner characteristic and a fixing device pressure application state will be described.

The melted state of the toner is determined by the fixing condition such as the fixing temperature, the fixing speed or the pressure and by a viscosity characteristic of the toner under the fixing condition, and a fixing pressure application state. When the fixing condition reaches a certain fixing condition, a degree of progression of toner melting is higher in the case where the lower toner viscosity is low, and therefore a fixing property is high or a color developing property is improved. On the other hand, in the case where the toner viscosity is high, the toner melting does not proceed and therefore the fixing property is low or the color developing property is degraded.

Further, when the toner reaches a certain viscosity state, a degree of wetting and spreading of the toner over the recording material is larger in the case where the pressure of the fixing device is high and therefore the fixing property is high or the color developing property is improved. On the other hand, the degree of wetting and spreading of the toner over the recording material is smaller in the case where the pressure of the fixing device is low and therefore the fixing property is low or the color developing property is degraded.

Figure 2:
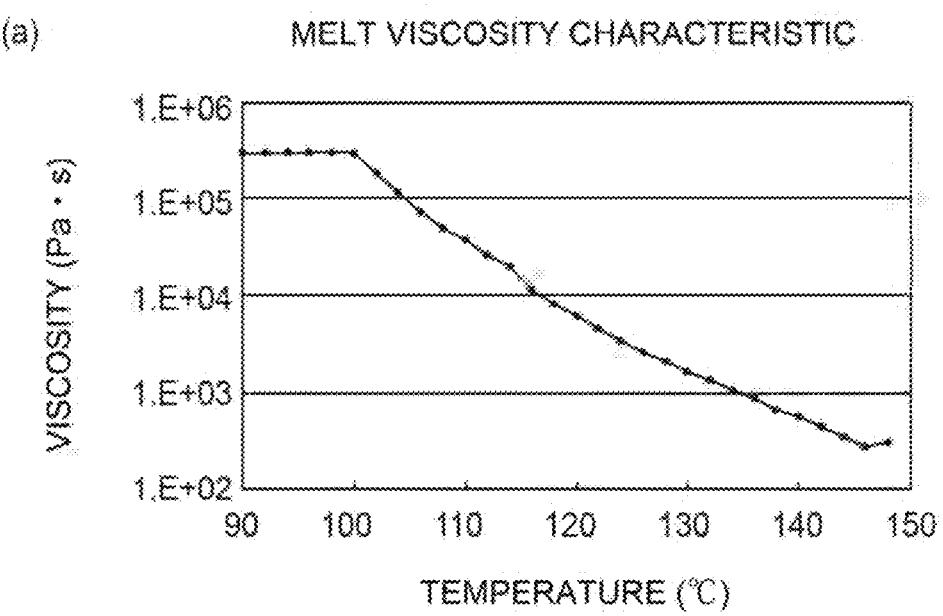
In FIG. 2, (a) is a graph of a viscosity characteristic with respect to a temperature of a toner used in the embodiment, and (b) is a graph showing a relationship among a position in a fixing nip with respect to a conveyance direction, a toner temperature at its position and a melt viscosity of the toner at its toner temperature in the embodiment.
Figure 2:
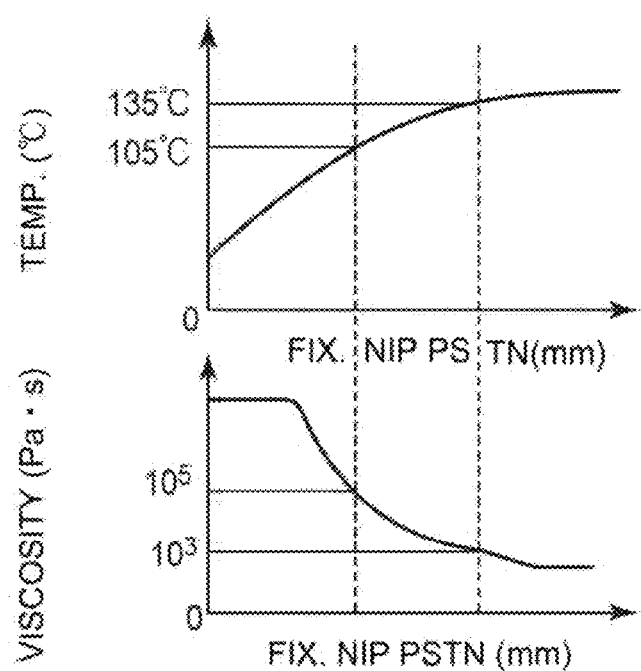

Part (b) of FIG. 2 shows a relationship among a position in the fixing nip N with respect to the recording material conveyance direction a, the toner temperature at the position, and the melt viscosity of the toner at the toner temperature. Incidentally, the toner temperature was measured by applying a thermocouple (Type K Fine and Sheet thermocouple "KFST-10-100-200", mfd. by AMBE SMT Co.) onto the recording material (recording medium), and a distribution of pressure was measured by using a tactile sensor ("Sealer", mfd. by NITTA Corp.).

The melt viscosity of the toner was measured by using an elevated flowtester ("CFT-100", mfd. by Shimadzu Corp.). A sample, of 1.0 g in weight, molded by using a pressure molding device was extruded from a nozzle of 1 mm in diameter and 1 mm in length while applying a load of 20 kgf by a plunger at a temperature rise ratio of 5.0° C./min, so that a lowering amount of the plunger of the flowtester was measured. As is understood from (b) of FIG. 2, in the fixing nip N, the toner temperature is gradually increased from a fixing entrance side with respect to the recording material conveyance direction a and is highest at the nip exit. For example, in the nip N, at the time when the toner temperature reaches 105° C., a corresponding toner viscosity is $1 \times 10^5$ Pa·s in this case, and at the nip exit, the toner temperature reaches 135° C. and the toner viscosity at this time is $1 \times 10^3$ Pa·s. Thus, the toner viscosity is changed in the nip, and depending on whether the toner viscosity is high or low, the degree of progression of toner melting is changed and the wetting and spreading property with respect to the recording material when the toner is pressed by the fixing device is also changed.

(Verification of Region in which Colors are Seen in Overlaid State)

Next, as a characteristic feature of this embodiment, a region in which the colors of chromatic toners different in color are seen in an overlaid state will be described with respect to a detecting method and a detection result while including a comparative embodiment. First, in the following description, as the chromatic toners, the Y (color) toner and the C (color) toner are used to conduct the verification, and a calculating method and a calculation result of a region in which the colors of Y toner image and the C toner image are overlaid, i.e., a region in which the color appears green (G color) are shown as a representative example. However, this is also true for other colors and the calculating method and the calculation result are not limited thereto. In this case, an image forming portion for forming the Y toner image on the recording material corresponds to the first image forming portion, and an image forming portion for forming the C toner image on the recording material corresponds to the second image forming portion.

In this verification, in the above-described fixing constitution, the process speed was 100 mm/s and the control temperature of the fixing portion was 180° C. Further, as the recording material, coated paper (basis weight: 150 g/m²; paper glossiness: about 30%) was used. Further, although described above, as the toner, the toner of 1.1 (g/cm³) in specific gravity ρ and 6.0 (μm) in weight-average particle size was used, and the maximum amount per unit area of the unfixed toner on the recording material was set so as to be 0.3 (mg/cm²).

(Secondary Color Region Calculating Method)

Figure 6:
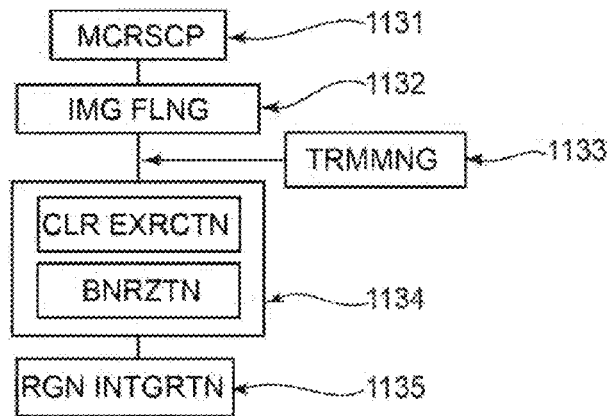
FIG. 6 is a system block diagram for secondary color region ratio calculation.
Figure 7:
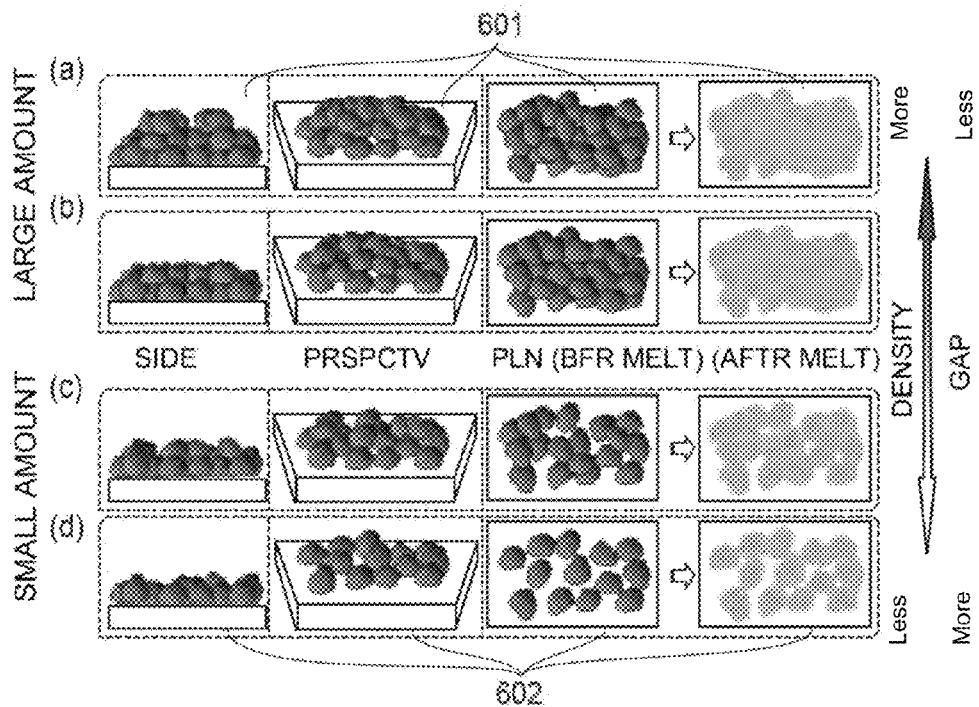
FIG. 7 illustrates toner amounts and covering states of paper (recording material).
Figure 8:
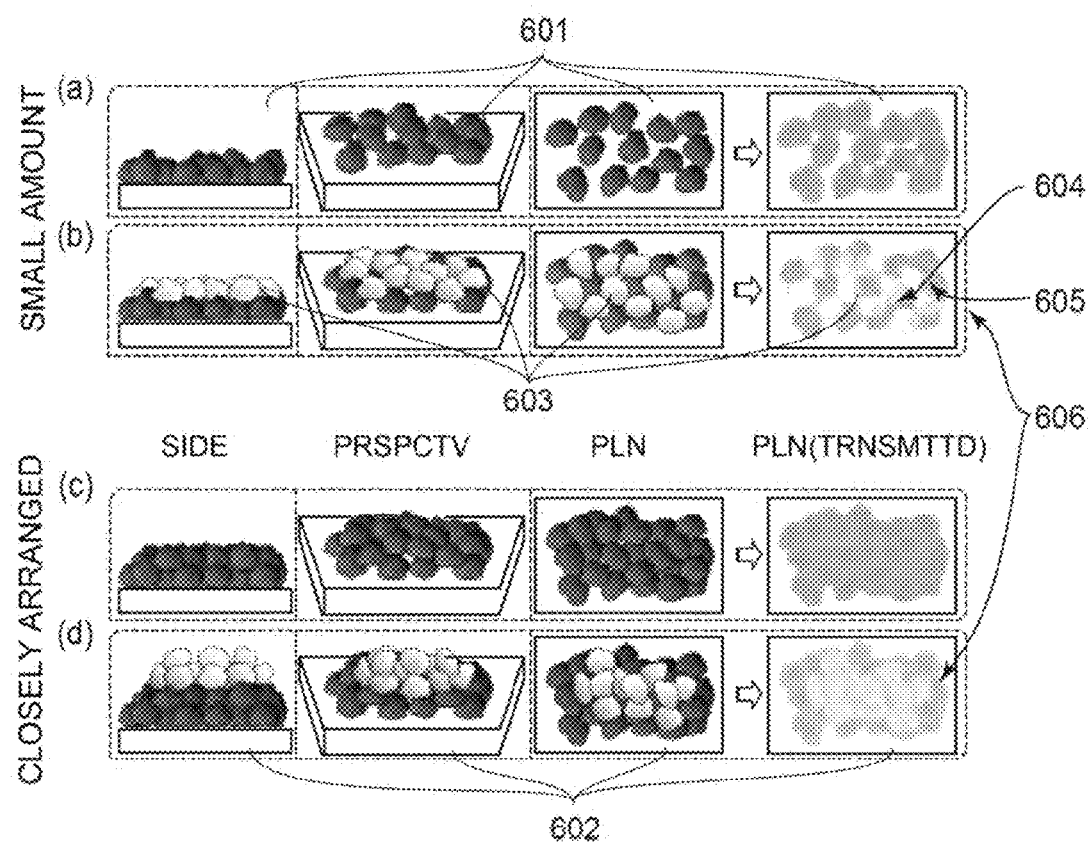
FIG. 8 illustrates toner amounts and toner layer formation states during a single layer and a secondary color.
Figure 9:
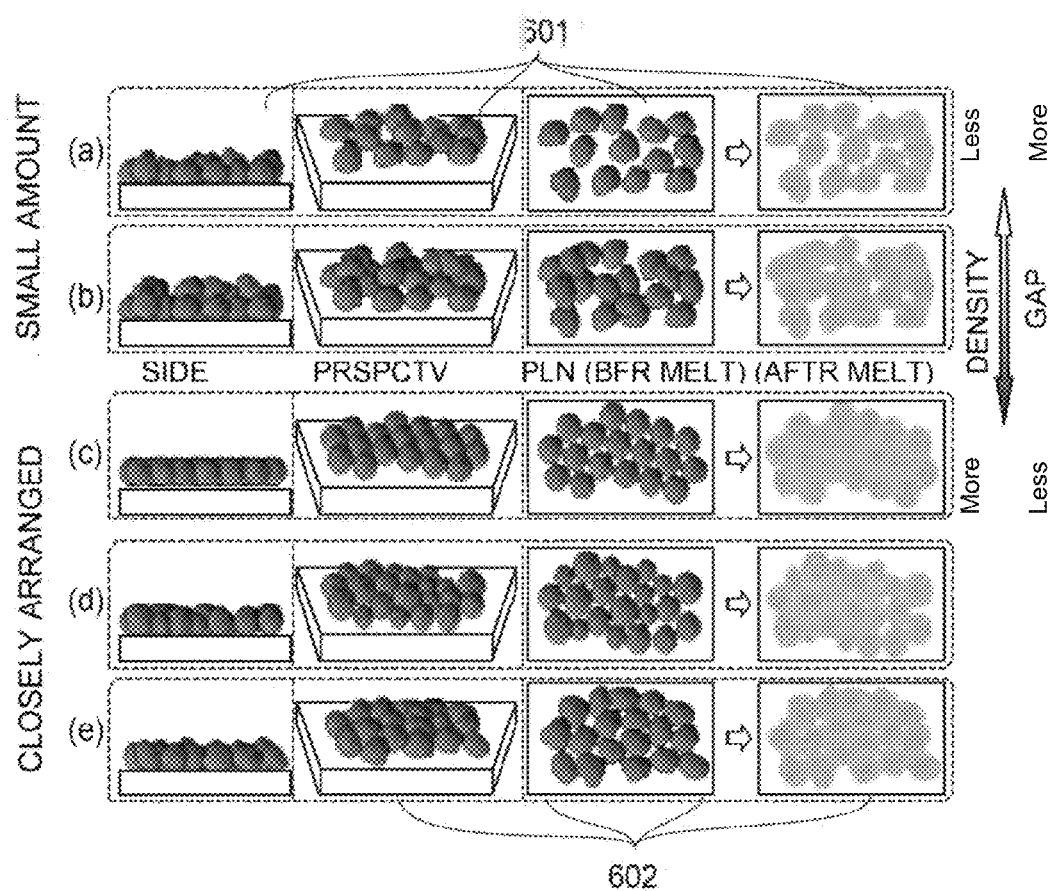
FIG. 9 shows toner layer formation states when the toner amount is small (when there is a gap) and when toners are arranged in one layer with no gap.
Figure 10:
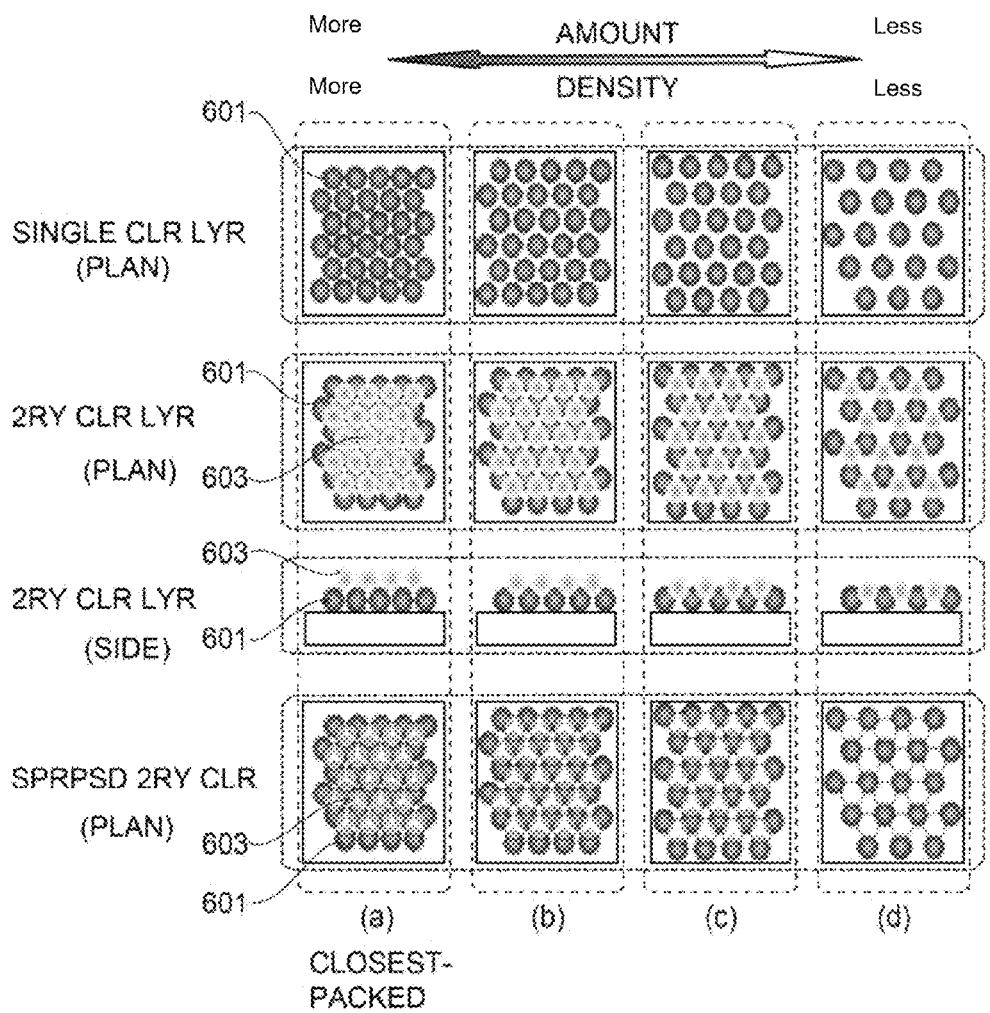
FIG. 10 illustrates toner layer formation states, with respect to the toner amount, of spherical toners with the same volume.
Figure 11:
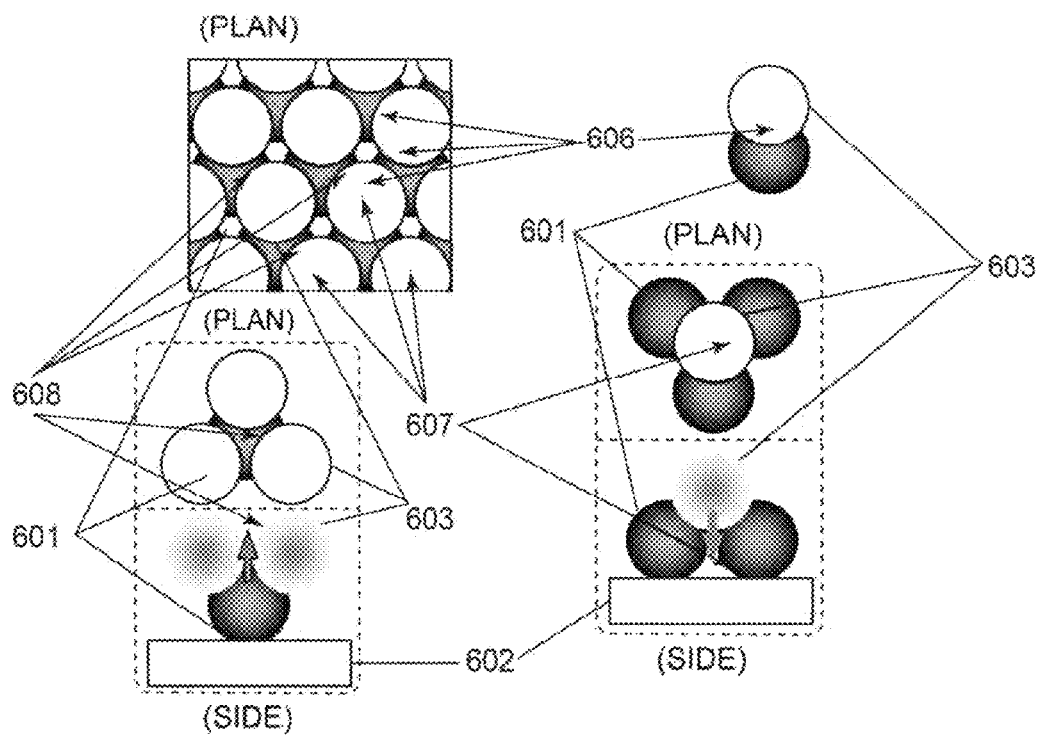
FIG. 11 illustrates overlaying of the toners.
Figure 12:
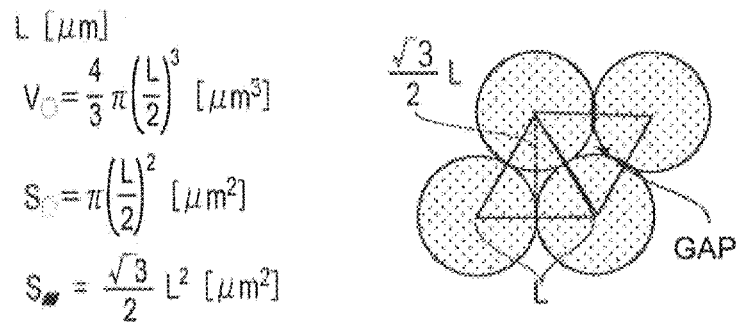
FIG. 12 is a view for illustrating various parameters during an ideal arrangement state.
Figure 13:
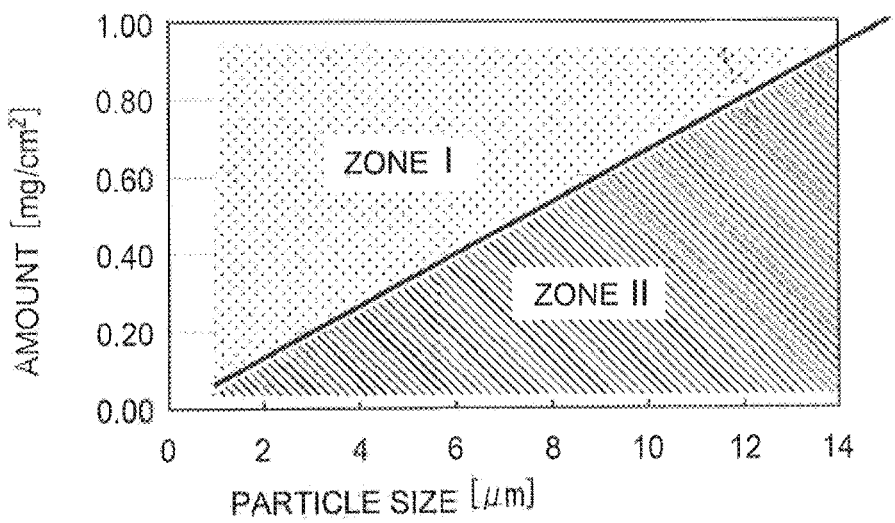
FIG. 13 illustrates a relationship between a toner particle size and a toner amount per unit area.
Figure 14:
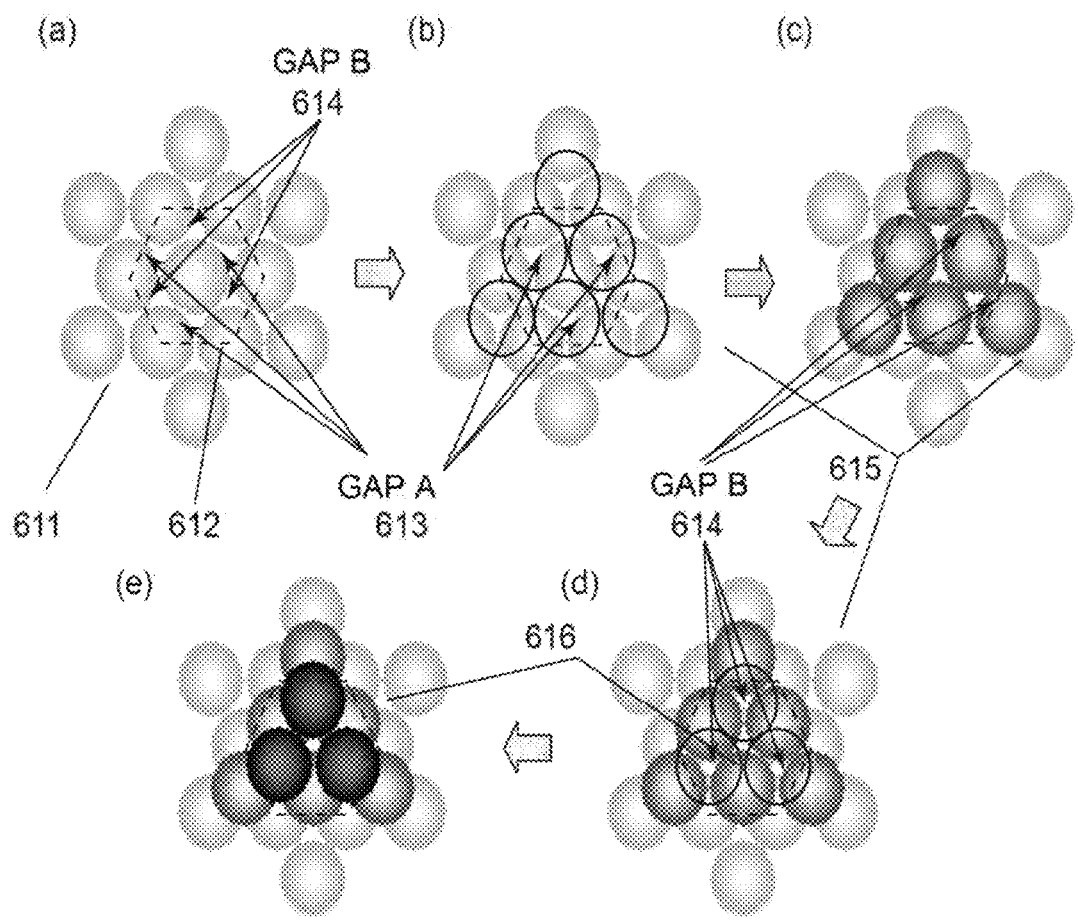
FIG. 14 illustrates a closed-packed lamination state of toners.

Next, from an image obtained by superposing two colors in such a condition and then by being fixed, a calculating method of the region in which the colors are seen in the overlaid state, i.e., the region in which the color appears green (hereinafter G region) in this case, will be described with reference to FIG. 6.

First, when the resultant image is subjected to transmission image observation through an optical microscope ("STM6-LM" measuring microscope, mfd. by OLYMPUS Corp.), it is possible to obtain microscopic images which appear C (color), Y (color) and B (color) (1131). In a region in which the C toner image and the Y toner image are not overlaid, the image appears C or Y as the single color and in the overlaid region, the image appears G. A condition for obtaining the microscopic image at this time was set as follows.

Eyepiece (Eye-lens): 10 magnifications
Objective lens: 5 magnifications
Region of actual field of view: 4.4 mm
Numerical aperture: 0.13
Light source filter: MM6-LBD for transmission
Output light quantity: MAX Further, the image obtained under the above condition was captured by and stored in an image filing software ("FLVFS-FIS", mfd. by OLYMPUS Corp.) (1132). At this time, camera properties were set as follows.

[Shutter Group]
Mode: slow
Shutter speed: 0.17 sec
[Level Group]
Gain: R=2.13, G=1.00, B=1.74
Offset: R/G/B=±0
While balance: at screen center
Gamma: R/G/B=0.67
Sharpness: none
[Gain (Camera: PGA-AMP)]
R/G/B=1.34

Next, the obtained microscopic image was subjected to trimming at a central portion where the light quantity within an observation region was stable (1133). The trimming was performed by using a software ("Adobe Photoshop", mfd. by Adobe Systems Inc.) and 2 mm square area was selected at an image central portion. Incidentally, this trimming operation is employed for being performed in the region in which the light quantity within the observation area was stable. It is also possible to effect, in place of the trimming, calibration or the like of the light quantity balance within the observation region.

Next, from the obtained trimming image, it is possible to perform binary-coded processing (binarization) at the secondary color portion and other portions (1134). By using an image processing software ("Image-Pro Plus", available from Planetron Inc.), a G (color) region in the observation region is calculated. The trimming image obtained from the microscopic image is subjected to binarization at the secondary color portion and at another portion (other than the secondary color portion) such as the single color portion or the background color portion, i.e., in the G region and in the C, Y or the background color region. In this case, the portion where the image appears G (color) is extracted in the obtained image by providing a threshold and is converted as a white portion and a portion where the image appears another color is converted as a black portion.

Figure 3:
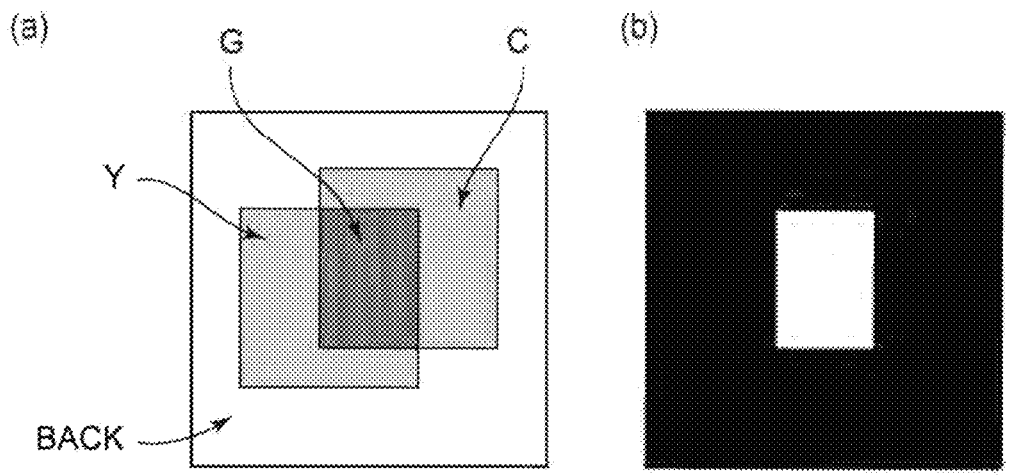
FIG. 3 includes schematic illustrations of binary image processing with respect to an obtained image in the embodiment.

With respect to the resultant binarized image, a count of the number of the white portion regions and an area of each white portion area are stored as a count file. The area of the white portion of the obtained binarized image is integrated by, e.g., "Excel" (mfd. by Microsoft Corp.), so that an area ratio of the while portion was calculated as the G region (1135). For example, when the image as seen in (a) of FIG. 3 is subjected to the above-described binarization, the binarized image of black portion/white portion as shown in (b) of FIG. 3 is obtained. When the ratio of the white portion is calculated in this binarized image, the ratio of the G area is calculated as follows.

$G$ region ratio(%)={(area of white portion)/(area of white portion+black portion){×100

={0.3×0.4/1.0×1.0}×100

=12%

(Image Forming Step)

In the following description, as the chromatic toners, the Y (color) toner and the C (color) toner are used to conduct the verification, and the calculation result of a region in which Y toner image and the C toner image are overlaid, i.e., a region which the color appears G color, is shown as an example. However, this is also true for other colors and the calculation result is not limited thereto.

First, with respect to the C toner image for the first color, the unfixed C toner image is formed on the drum 1c of the third image forming portion Pc and is primary-transferred onto the belt 11. The C toner image on the belt 11 is secondary-transferred onto the recording material S at the secondary transfer portion. Then, the recording material S subjected to the transfer of the C toner image is introduced into the fixing device 19, so that the unfixed C toner image is fixed as a fixed image on the recording material surface by heat and pressure. The recording material S for which the image forming and fixing step for the first time is ended passes through the conveying paths 22, 23 and 15 and is introduced again into the secondary transfer portion.

Next, with respect to the Y toner image for the second color, the unfixed Y toner image is formed on the drum 1a of the first image forming portion Pa and is primary-transferred onto the belt 11. The Y toner image on the belt 11 is secondary-transferred onto the recording material S, on which the already-fixed C toner image has been formed, at the secondary transfer portion. Then, the recording material S subjected to the transfer of the Y toner image is introduced into the fixing device 19, so that the unfixed Y toner image is fixed as a fixed image on the recording material surface by heat and pressure. The recording material S for which the image forming and fixing step for the second time is ended and on which the already-fixed C toner image and Y toner image have been formed passes, as an output product, through the conveying paths 22 and 25 and the discharge opening 26 and is discharged on the tray 27.

(G Color Region Ratio Verification Experiment)

By using the method as described above, the microscopic observation of the image obtained in the fixing device constitution and fixing condition in this embodiment was actually made to calculate the ratio of the G (color) region. Further, the case where only one time of the image formation is effected under the image forming condition in this embodiment, i.e., the case where the Y and C toner images are formed on the belt 11 by performing an interrelation operation of the first image forming portion Pa and the third image forming portion Pc and are collectively transferred/fixed on the recording material, is Comparative Embodiment 1.

Further, the case where only one time of the image formation is effected in the toner amount, set so that the maximum amount per unit area of the unfixed toner on the recording material is 0.6 (mg/cm$^2$), under the fixing condition in this embodiment is Comparative Embodiment 2, and the case where two times of the image formation are effected is Comparative Embodiment 3. Verification of these Comparative Embodiments 1, 2 and 3 was conducted. Incidentally, the unfixed toner amounts in Comparative Embodiments 2 and 3 were set to satisfy the condition:

$A > (\rho \Pi L)/30\sqrt{3}$.

Incidentally, values of the number of (time of) image formation, the relational formula among the unfixed toner amount A, the specific gravity $\rho$ and the weight-average particle size L, and the G region ratio and the chroma C* are shown in Table 1.

TABLE 1

| | THIS EMB. | COMP. EMB. 1 | COMP. EMB. 2 | COMP. EMB. 3 |
|---|---|---|---|---|
| NOIF*[1] | 2 | 1 | 1 | 2 |
| UTA*[2] | 0.3 | 0.3 | 0.6 | 0.6 |
| RF*[3] | A < (ρπL)/30√3 | A < (ρπL)/30√3 | A < (ρπL)/30√3 | A < (ρπL)/30√3 |
| GRR*[4] | 93.2 | 48 | 92.8 | 95.2 |
| CHROMA C* | 86.8 | 75.9 | 85.4 | 87.2 |

*[1]"NOIF" represents the number of (times of) image formation.
*[2]"UTA" represents the unfixed toner amount.
*[3]"RF" represents the relational formula.
*[4]"GRR" represents the G region ratio.

First, microscopic images obtained under the conditions of this embodiment and Comparative Embodiments 1, 2 and 3, respectively, are obtained. With respect to these images, when the above-described binarization was effected, the images were as shown in (a), (b), (c) and (d) of FIG. 4 and when the G regions were calculated, the resultant G region ratios were 93.2%, 48.0%, 92.8% and 95.2%, respectively.

At this time, values of index C* representing the chroma of the respective images were 96.8, 75.9, 85.4 and 87.2, respectively. Incidentally, the chroma C* is, in (L*, a*, b*) which is a color coordinate in CIELAB space which is a color space, represented b: $C^* = ((a^*)^2 + (b^*)^2)^{0.5}$. The color coordinate is a value measured by Gretag Macbeth Spectro Scan ("Status Code A", mfd. by Gretag Macbeth AG).

Figure 4:
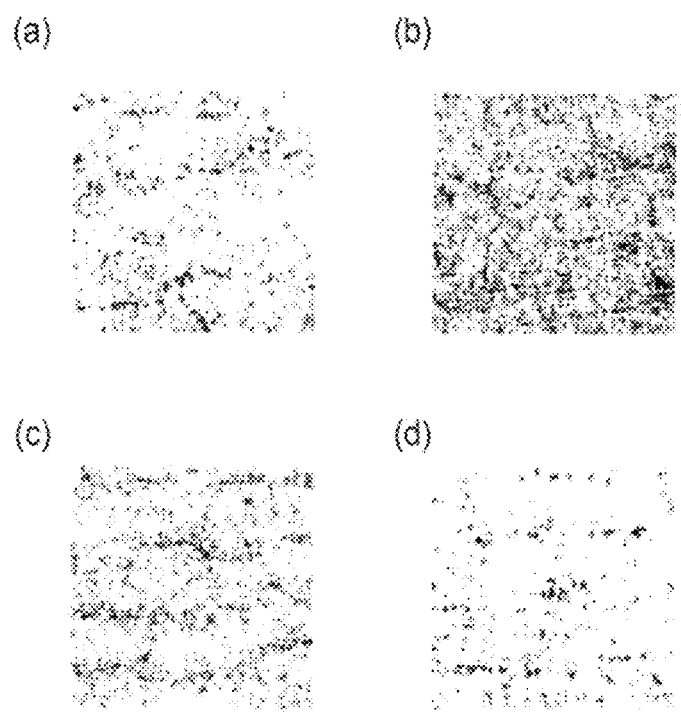
FIG. 4 includes binary-processed images in the embodiment and in comparative embodiment.

When (a) and (b) of FIG. 4 are compared, it is understood that the G region is considerably increased in the case where the two times of image forming steps are obtained as in this embodiment. This is because in the case where the toners different in color are superposed in the unfixed state, the upper layer-side toner is fixed while filling the gap of the lower layer-side toners and therefore a phenomenon such that overlaying of the colors is impaired arises. On the other hand, as in this embodiment, by once fixing the colors every single color, the image forming/fixing step is performed without impairing the overlaid of the colors as described above and therefore the overlaid of the colors is remarkably increased and as a result, the chroma C* is remarkably increased. Incidentally, as is understood from this, in a state in which the toners different in color are superposed in the unfixed state, the G region ratio is less than 84%. In this embodiment, the G region ratio is a ratio lower than 48% in Comparative Embodiment 1 after the fixing.

On the other hand, in (c) and (d) of FIG. 4, the fixing step is performed in the maximum amount per unit area, of the unfixed toner on the recording material, of 0.6 (mg/cm2). (c) is the image obtained by subjecting the obtained image to the binarization in case of Comparative Embodiment 2, and (d) is the image obtained by subjecting the obtained image to the binarization in the case of Comparative Embodiment 3 in which the two times of image formation were effected. When these are compared, it is understood that in both of the case where the fixing step is performed one time and the case where the fixing step is performed two times, the G region is not so increased. Further, from Table 1, it is understood that also the chroma is not so increased. This is because the overlaying of the colors is large in the unfixed toner state and therefore sufficient overlaying of the colors is obtained in the one time of the image forming step.

That is, as in the prior art, in the case where the fixed image is obtained in a region in which the toner amount is large to some extent (i.e., the region of: $A > (\rho \Pi L)/30\sqrt{3}$), it is possible to obtain sufficient overlaying of the colors in one time of the fixing step. Therefore, it was possible to achieve the increase in chroma and enlargement of the color reproduction range, but in a region in which the toner amount is small (i.e., the region of: $A < (\rho \Pi L)/30\sqrt{3}$), when there is no step of increasing the overlaying of the colors, the color reproduction range is extremely lowered.

Figure 5:
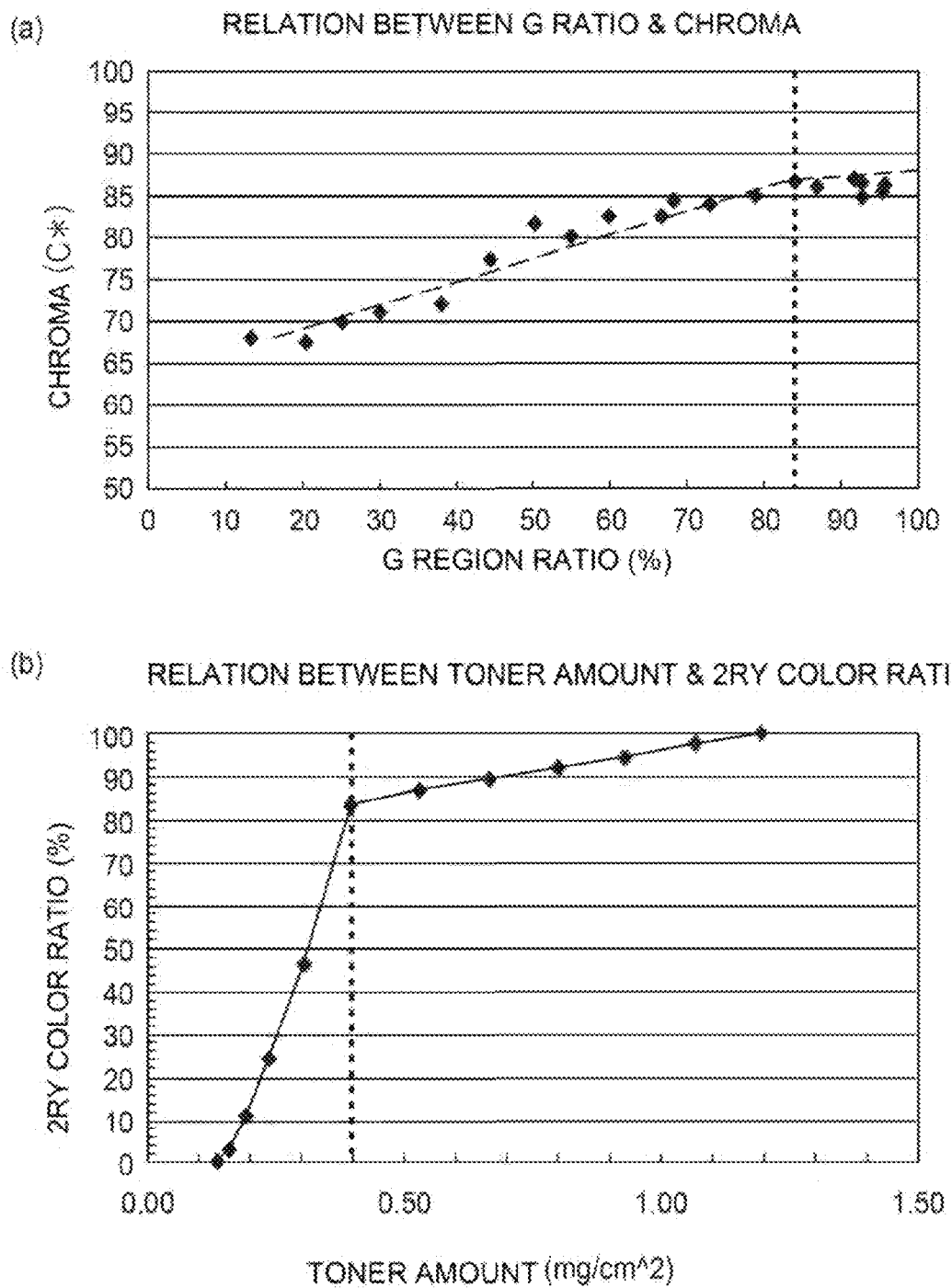
In FIG. 5, (a) is a graph showing a relationship between a G region and chroma (saturation) in the embodiment, and (b) is a graph of a result of mathematical calculation of a relationship between a secondary color ratio and a toner amount per unit area in the embodiment.

Part (a) of FIG. 5 is verification of the chroma at the time when under the toner condition of this embodiment, the G region ratio is changed while changing the fixing condition. As is understood from (a) of FIG. 5, although a variation is somewhat generated, it is understood that a slope with respect to the chroma is changed at 84% as a boundary in terms of the G region ratio. This is because as described above, the secondary color region of 84% is a ratio at which the toners are adjacent to each other and the gap among the toners becomes minimum. Therefore, up to the secondary color region of 84%, the chroma shows a tendency of abrupt increase or decrease and therefore it is important that the secondary color ratio is at least 84% or larger.

Further, (b) of FIG. 5 is, when the toners are 1.1 (g/cm$^3$) in specific gravity $\rho$ and 6.0 ($\mu$m) in weight-average particle size, a mathematically calculated relationship between the secondary color ratio and the toner amount per unit area when the toners are uniformly disposed on the recording material. As is understood from also (b) of FIG. 5, it is understood that a slope of the secondary color ratio is remarkably changed at 84% as a boundary and a degree of increase becomes dull.

In the case of this calculation, when the single color toner amount per unit area becomes 0.399 (mg/cm$^2$), the toners are adjacent to each other and the secondary color ratio becomes 84% but this value of 84% is a constant value even when the toner particle size and specific gravity are changed. Therefore, the value obtained from the calculation and the verified value show the substantially same tendency, i.e., show the abrupt increase or decrease tendency of the chroma up to the secondary color region of 84%, so that it is understood that it is important that the secondary color ratio is at least 84% or larger.

As described above, an operation in which the unfixed image of each single color toner is once fixed on the recording material in the image forming step, fixing device constitution and fixing condition in this embodiment, and thereafter the unfixed image of another single color toner is formed thereon and then the fixing step is performed again is repeatedly effected. By this, the secondary color ratio is capable of exceeding 84% by performing the image forming and fixing step for the 4 colors. Therefore, even in the case where the toner consumption is decreased, it is possible to prevent the degree of overlaying of the colors from being decreased and it is possible to provide an image forming apparatus which obtains a wide color reproduction region.

Incidentally, the image forming apparatus in this embodiment forms the four color-based full-color image by applying, four times, the image forming and fixing step to the same recording material while changing the color of the toners but the present invention is not limited thereto. The present invention is effectively applicable to an image forming apparatus for forming a superposed image of a plurality of chromatic toner images different in color by applying, at least two times, the image forming and fixing step to the same recording material while changing the control of the toners.

Second Embodiment

In First Embodiment, the driving type of the fixing device was determined so that the moving speed of the fixing member contacted to the toner image on the recording material and the moving speed of the recording material are the substantially same speed at the fixing nip. In such a constitution, even in the case where the maximum toner amount per unit area satisfying: $A < (\rho \Pi L)/30\sqrt{3}$ was set, the region in which the colors of the respective chromatic toners were seen in the overlaid state could be made 84% or more. However, the present invention is not limited to a constitution in which the recording material is passed through the fixing nip plural times when the color image is formed on the recording material.

A constitution in which the region where the colors of the chromatic toners are seen in the overlaid state is 84% or more, during formation of the color image on the recording material, even when the number of times of passing of the recording material through the nip or in the case where the maximum toner amount per unit area satisfying: $A < (\rho \Pi L)/30\sqrt{3}$ is set will be described.

In this embodiment, the driving type of the fixing device is determined so that a peripheral speed difference between the fixing member moving speed and the recording material moving speed in the fixing nip is 2%.

Specifically, the fixing roller and the pressing roller are rotationally driven independently by driving motors, respectively. These rollers are independently rotated so that this rotational speed is 100 mm/s for the fixing roller and is 98 mm/s for the pressing roller to provide the peripheral speed difference of 2% between the roller pair and thereby a force for spreading the toner, to be fixed, relatively in an in-plane direction is increased, so that it is possible to effectively increase the region in which the colors of the respective chromatic toners are seen in the overlaid state.

Next, values of the relational formula among the unfixed toner amount A, the specific gravity p and the weight-average particle size L, and the G region ratio and the chroma C* (when the peripheral speed difference is 2% (Embodiment 2) are shown in Table 2. Incidentally, the measuring method of the chroma C* is the same as that in Embodiment 1.

TABLE 2

|  | THIS EMB2. | EMB. 1 | COMP. EMB. 1 |
| --- | --- | --- | --- |
| NOIF*[1] | 2 | 2 | 1 |
| UTA*[2] | 0.3 | 0.3 | 0.3 |
| RF*[3] | $A < (\rho \pi L)/30\sqrt{3}$ | $A < (\rho \pi L)/30\sqrt{3}$ | $A < (\rho \pi L)/30\sqrt{3}$ |
| GRR*[4] | 90.3 | 93.2 | 48 |
| CHROMA C* | 84.9 | 86.8 | 75.9 |

*[1]"NOIF" represents the number of (times of) image formation.
*[2]"UTA" represents the unfixed toner amount.
*[3]"RF" represents the relational formula.
*[4]"GRR" represents the G region ratio.

As shown in Table 2, it is understood that by using the constitution providing the peripheral speed difference in the fixing nip and increasing the toner spreading force in the in-plane direction as in this Embodiment 2, the G region ratio becomes remarkably larger than that in a constitution providing no peripheral speed difference as in Comparative Embodiment 1, with the result that the chroma C* becomes large and the color developing property is improved.

In this embodiment, the region in which the colors of the respective chromatic toners before the fixing are seen in the overlaid state (G region ratio) is less than 84% and by effecting the fixing by the fixing device of this embodiment, the G region ratio can exceed 84%.

Thus, in this embodiment, the constitution in which the number of times of the image formation is one time is employed and on the other hand, the constitution in which the peripheral speed difference between the fixing member and the recording material in the fixing nip is provided by changing the driving type was employed. By such constitutions, the region where the colors of the chromatic toners are seen in the overlaid state could be made 84% or more, during formation of the color image on the recording material, even when the number of times of passing of the recording material through the nip was one time or in the case where the maximum toner amount per unit area satisfies $A<(\Pi\Pi L)/30\sqrt{3}$.

As described above, as a constitution in which the maximum toner amount per unit area satisfying: $A<(\rho\Pi L)/30\sqrt{3}$ providing the region where the colors of the chromatic toners are seen in the overlaid state is 84% or more, during formation of the color image on the recording material, even in the case where the number of times of passing through the fixing nip is one, the present invention is applicable.

(Others)

1) In the image forming apparatus of the present invention, the forming process of the unfixed toner image with the chromatic toner with respect to the recording materials is not limited to the transfer type electrophotographic process in the embodiments. The forming process may also be other image forming processes, such as an electrostatic recording process and a magnetic recording process, of the transfer type or a direct type.

2) The fixing means (fixing device) 19 of the unfixed toner image is also not limited to the device of the heating roller type. The fixing means may also be a heating and pressing device having another constitution using a belt or a film as the fixing member, or a device of an electromagnetic induction heating type, or the like.

INDUSTRIAL APPLICABILITY

As described above, by the present invention, even in the case where the toner consumption is decreased, it is possible to obtain the wide color reproduction region by preventing the degree of overlaying of the colors from being decreased.

In the above, although the embodiments of the present invention are described, the present invention is not limited to the above-described embodiments at all but any modification is possible within the technical concept of the present invention.

The invention claimed is:

1. An image forming apparatus, comprising:
   a first image forming portion for forming a first toner image on a recording material under a condition satisfying a relationship $A1<(\rho1\Pi L1)/30\sqrt{3}$, where a specific gravity of a toner of a first color is $\rho1$ (g/cm$^3$), a weight-average particle size is L1 (μm), and a maximum toner amount per unit area of the toner to be formed on the recording material before fixing is A1 (mg/cm$^2$);
   a second image forming portion for forming a second toner image on a recording material under a condition satisfying a relationship $A2<(\rho2\Pi L2)/30\sqrt{3}$, where a specific gravity of a toner of a second color is $\rho2$ (g/cm$^3$), a weight-average particle size is L2 (μm), and a maximum toner amount per unit area of the toner to be formed on the recording material before fixing is A2 (mg/cm$^2$); and
   a fixing device for fixing the first and second toner images on the recording material so that when said image forming apparatus forms the first and second toner images on the recording material by superposing, on the first toner image formed with the maximum toner amount per unit area A1 by said first image forming portion, the second toner image formed with the maximum toner amount per unit area A2 by said second image forming portion, a first-and-second-toner-image-overlaying ratio is 84% or more.

2. An image forming apparatus according to claim 1, wherein the maximum toner amount per unit area A1 and the maximum toner amount per unit area A2 are the substantially same value.

3. An image forming apparatus according to claim 1, wherein said fixing device includes a fixing member for fixing each toner image on the recording material by contact with the toner image on the recording material, a pressing member for pressing the fixing member to form a nip through which the recording material is nip-conveyed, and driving means for generating a difference between a moving speed of the fixing member and a moving speed of the recording material in the nip.

4. An image forming apparatus according to claim 1, wherein said fixing device includes an executing portion for executing an operation for fixing on the recording material the second toner image formed by said second image forming portion by passing, after the first toner image formed by said first image forming portion is fixed on the recording material, the recording material through said fixing device again.

5. An image forming apparatus according to claim 1, wherein when the first toner image formed with the maximum toner amount per unit area A1 by said first image forming portion before fixing and the second toner image formed with the maximum toner amount per unit area A2 by said second image forming portion before fixing are formed on the recording material, the first-and-second-toner-image-overlaying ratio is less than 84%.

\* \* \* \* \*